(12) United States Patent
Dolega et al.

(10) Patent No.: US 10,216,771 B2
(45) Date of Patent: Feb. 26, 2019

(54) CREATING AND HANDLING IDENTIFICATION FOR A RESOURCE IN A CONFIGURATION DATABASE

(71) Applicant: INTERNATIONAL BUSINESS MACHINES CORPORATION, Armonk, NY (US)

(72) Inventors: Jacek Dolega, Cracow (PL); Tomasz Pawel Kania, Cracow (PL); Andrzej W. Laskawiec, Cracow (PL); Krzysztof Porowski, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 471 days.

(21) Appl. No.: 14/871,545

(22) Filed: Sep. 30, 2015

(65) Prior Publication Data

US 2016/0098428 A1    Apr. 7, 2016

(30) Foreign Application Priority Data

Oct. 1, 2014 (GB) .................................. 1417375.1

(51) Int. Cl.
    *G06F 17/30*      (2006.01)
(52) U.S. Cl.
    CPC .. *G06F 17/30292* (2013.01); *G06F 17/30312* (2013.01); *G06F 17/30575* (2013.01)
(58) Field of Classification Search
None
See application file for complete search history.

(56) References Cited

U.S. PATENT DOCUMENTS

| | | | |
|---|---|---|---|
| 7,720,794 B2 | 5/2010 | Wood | |
| 8,290,949 B2 | 10/2012 | Baker et al. | |
| 8,402,042 B2 | 3/2013 | Jung et al. | |
| 2003/0033300 A1* | 2/2003 | Bergman | G06F 17/30274 |
| 2007/0276779 A1* | 11/2007 | Baker | G06F 17/3051 |
| 2011/0153787 A1* | 6/2011 | Baker | H04L 29/12801 |
| | | | 709/221 |
| 2012/0096163 A1 | 4/2012 | Tai et al. | |
| 2012/0259812 A1 | 10/2012 | Rangarajan et al. | |
| 2012/0290610 A1 | 11/2012 | Hoang | |
| 2015/0120939 A1 | 4/2015 | Islam et al. | |

\* cited by examiner

*Primary Examiner* — Jau-Shya Meng
(74) *Attorney, Agent, or Firm* — Richard Wilhelm; Matthew M. Hulihan; Heslin Rothenberg Farley & Mesiti PC

(57) ABSTRACT

Creating for a resource a representation including properties of the resource. Determining and analyzing defined naming rules for a configuration database, each naming rule including a naming rule identification, a priority and at least one attribute having an attribute name. For each naming rule applicable to the resource, extracting at least one attribute value for each attribute name from the resource representation. For each naming rule applicable to the resource, creating a complex identity object containing a naming rule identification and a list of attribute names and attribute values. For each created complex identity object, set an authority flag if a given provider is able to obtain a complete set of values for the attributes. Processing through each complex identity object according to priority of the corresponding naming rule. Generating an alias for each result of a Cartesian product of each attribute value of the list of attribute names.

20 Claims, 20 Drawing Sheets

CREATING AND HANDLING IDENTIFICATION FOR A RESOURCE IN A CONFIGURATION DATABASE

PRIOR FOREIGN APPLICATION

This application claims priority from United Kingdom (GB) patent application number 1417375.1, filed Oct. 1, 2014, which is hereby incorporated herein by reference in its entirety.

BACKGROUND

One or more aspects of the present invention relate, in general, to the field of configuration databases, and in particular to creating and handling identification for a resource in a configuration database.

As described in U.S. Pat. No. 8,290,949 B2 by Baker et al., which is hereby incorporated by reference herein in its entirety, one of the primary goals for a configuration management database (CMDB) is to provide support for configuration items or resources as defined by the IT infrastructure library (ITIL). Along with representing and storing relationships between resources, another important purpose of the configuration management database is to provide a correlation mechanism between resources. For example, two management products may discover a single computer system, and yet call them different names. In order to provide a correlation mechanism, a notion of an object naming rule is used, defined as a set of object attributes which are uniquely identifying a given instance. With the quickly increasing complexity of IT environments, it may be seen that it is not possible to maintain one single model of the IT infrastructure, see Tivoli Common Data Model, for example, consisting from detailed definitions of object types with all the attributes and relations describing properties of the objects on which definitions of naming rules might be based. Every new flavor of the object might require a slightly different set of identifying attributes which requires new attributes to be added to the data model to build a base for a new naming rule, which very often requires model tables to be extended with new columns.

SUMMARY

A technical problem underlying aspects of the present invention is to create and handle identification for a resource in a configuration database, which is able to improve resource name reconciliation in a configuration database and to solve the above mentioned shortcomings and pain points of prior art configuration databases.

In accordance with an aspect of the present invention, a method of creating and handling identification for a resource in a configuration database is provided. The method includes discovering the resource; creating for the resource a resource representation comprising properties of the resource; determining and analyzing one or more defined naming rules for the configuration database, wherein a naming rule includes a naming rule identification, a priority and at least one attribute having an attribute name; for the naming rule applicable to the resource, extracting at least one attribute value for the attribute name from the resource representation as at least one of a combination or transformation of properties of the resource; for the naming rule applicable to the resource, creating a complex identity object containing the naming rule identification and a list of attribute names and attribute values of the corresponding naming rule; for the created complex identity object, setting an authority flag based on a given provider being able to obtain a complete set of values for the attributes; processing through one or more complex identity objects according to priority of the corresponding naming rule; and generating an alias for a result of a Cartesian product of each attribute value of the list of attribute names in a processed complex identity object by concatenating the corresponding naming rule identification and said attribute values.

In accordance with another aspect of the present invention, a computer program product for creating and handling identification for a resource in a configuration database is provided. The computer program product includes a computer readable storage medium readable by a processing circuit and storing instructions for execution by the processing circuit for performing a method. The method includes discovering the resource; creating for the resource a resource representation comprising properties of the resource; determining and analyzing one or more defined naming rules for the configuration database, wherein a naming rule includes a naming rule identification, a priority and at least one attribute having an attribute name; for the naming rule applicable to the resource, extracting at least one attribute value for the attribute name from the resource representation as at least one of a combination or transformation of properties of the resource; for the naming rule applicable to the resource, creating a complex identity object containing the naming rule identification and a list of attribute names and attribute values of the corresponding naming rule; for the created complex identity object, setting an authority flag based on a given provider being able to obtain a complete set of values for the attributes; processing through one or more complex identity objects according to priority of the corresponding naming rule; and generating an alias for a result of a Cartesian product of each attribute value of the list of attribute names in a processed complex identity object by concatenating the corresponding naming rule identification and the attribute values.

In accordance with yet another aspect of the present invention, a computer system for creating and handling identification for a resource in a configuration database is provided. The computer system includes a memory; and a processing device in communication with the memory, wherein the computer system is configured to perform a method. The method includes discovering the resource; creating for the resource a resource representation comprising properties of the resource; determining and analyzing one or more defined naming rules for the configuration database, wherein a naming rule includes a naming rule identification, a priority and at least one attribute having an attribute name; for the naming rule applicable to the resource, extracting at least one attribute value for the attribute name from the resource representation as at least one of a combination or transformation of properties of the resource; for the naming rule applicable to the resource, creating a complex identity object containing the naming rule identification and a list of attribute names and attribute values of the corresponding naming rule; for the created complex identity object, setting an authority flag based on a given provider being able to obtain a complete set of values for the attributes; processing through one or more complex identity objects according to priority of the corresponding naming rule; and generating an alias for a result of a Cartesian product of each attribute value of the list of attribute names in a processed complex identity object by concatenating the corresponding naming rule identification and the attribute values.

The above, as well as additional purposes, features, and advantages of aspects of the present invention will become apparent in the following detailed written description.

BRIEF DESCRIPTION OF THE DRAWINGS

One embodiment of the present invention, as described in detail below, is shown in the drawings, in which.

DETAILED DESCRIPTION

Figure 1:
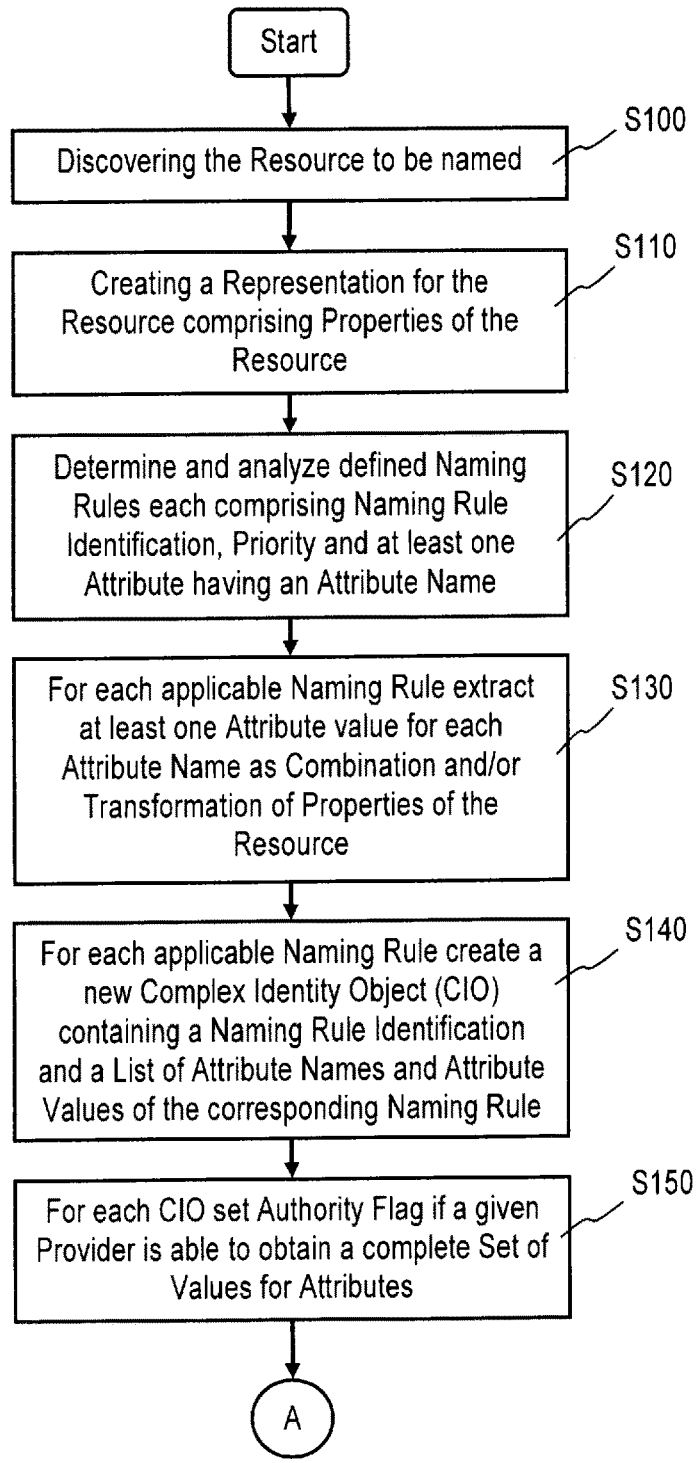
FIGS. 1 to 5 is a schematic flow diagram of a method for creating and handling identification for a resource in a configuration database, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
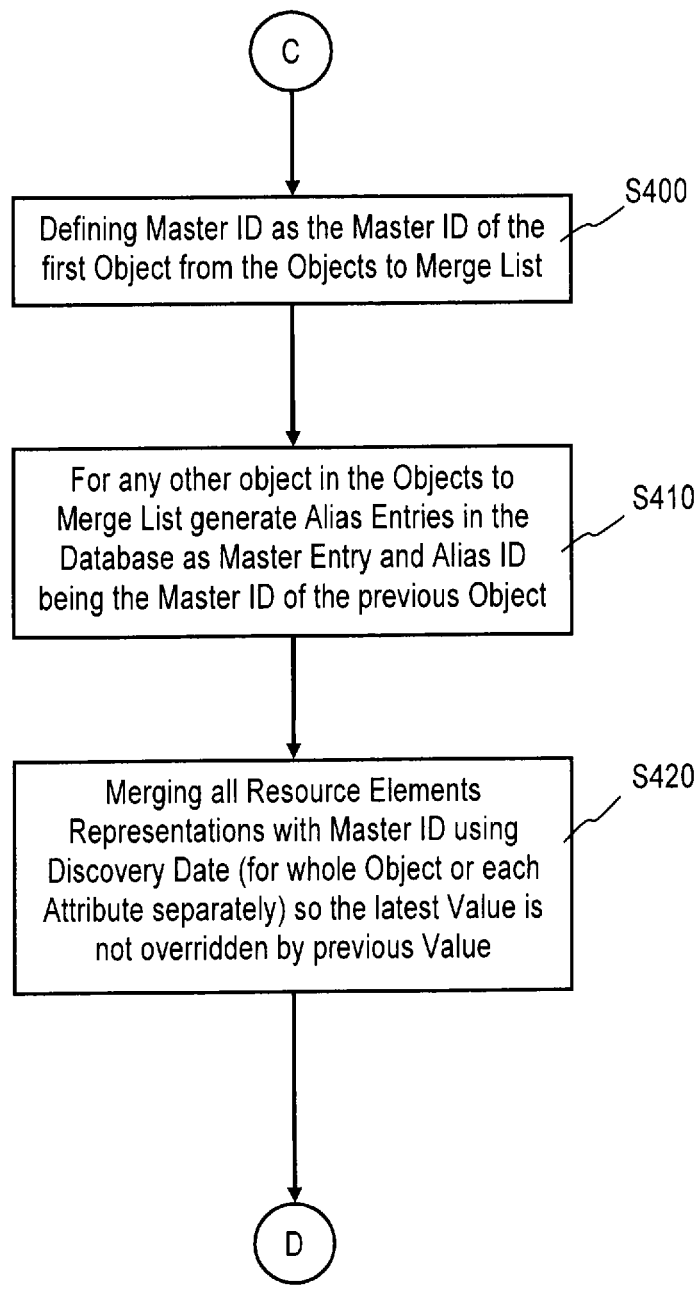
Figure 5:
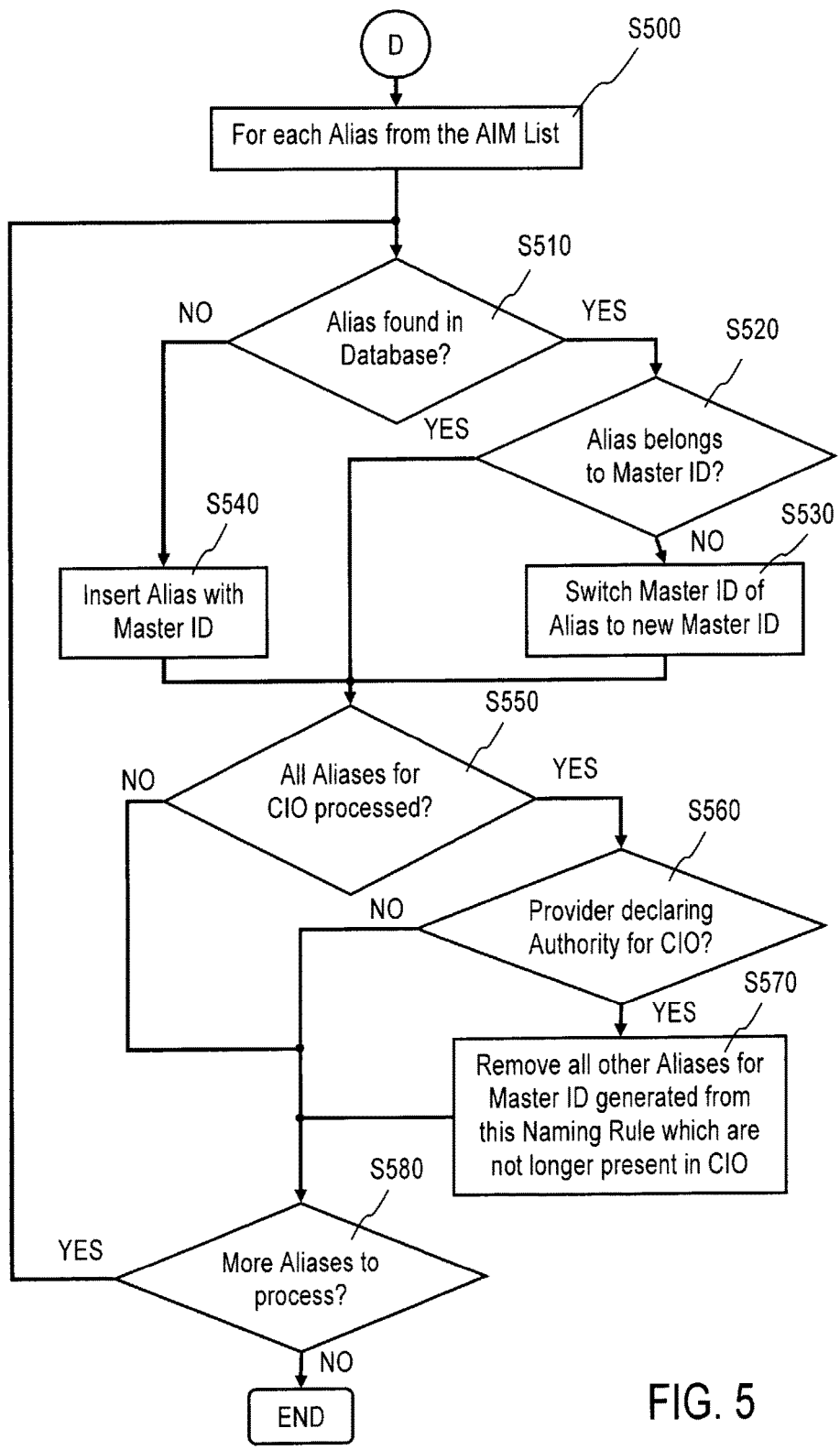
Figure 6:
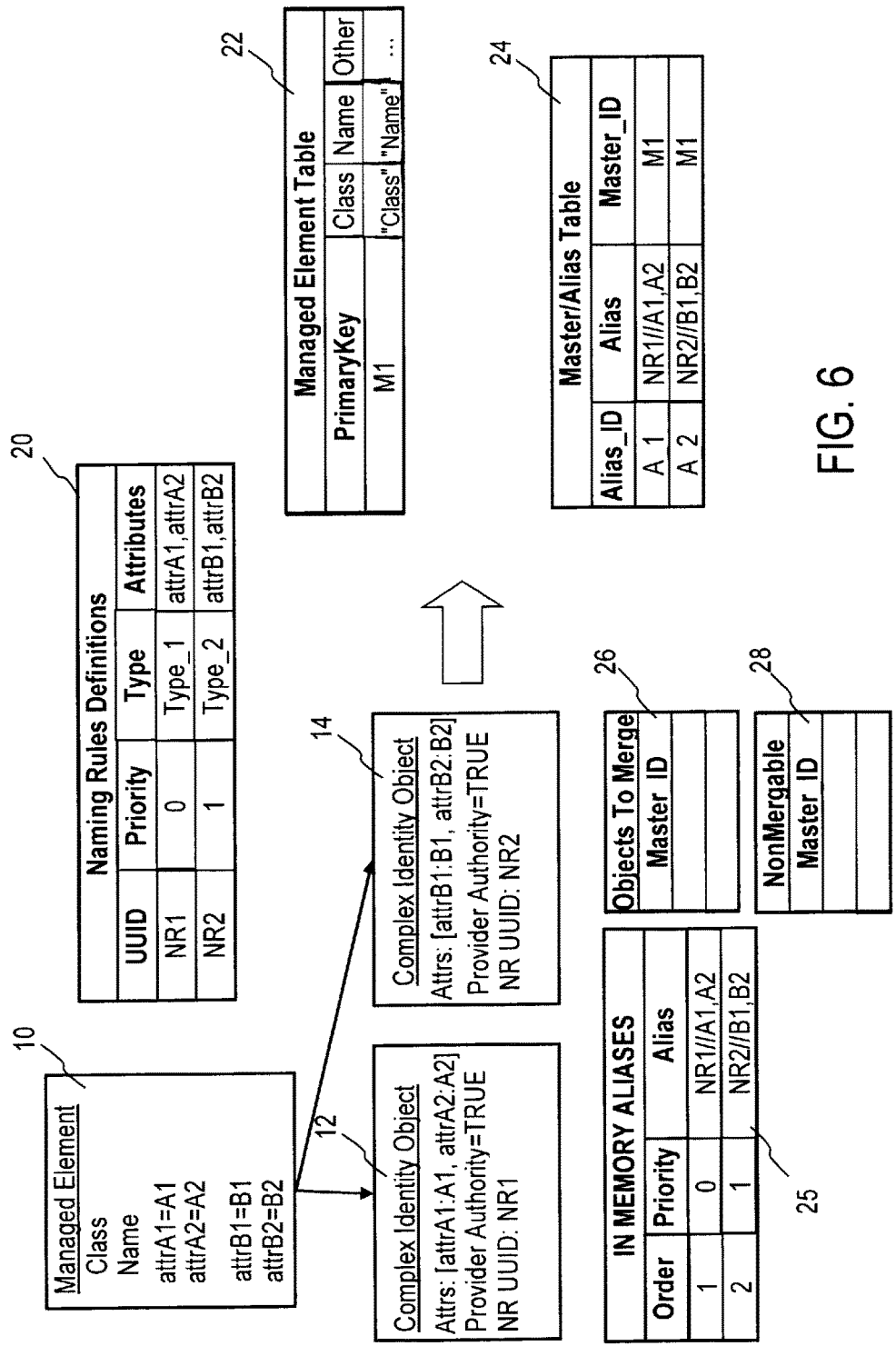
FIG. 6 is a schematic block diagram of a naming strategy based on complex identity objects, in accordance with an embodiment of the present invention.
Figure 7:
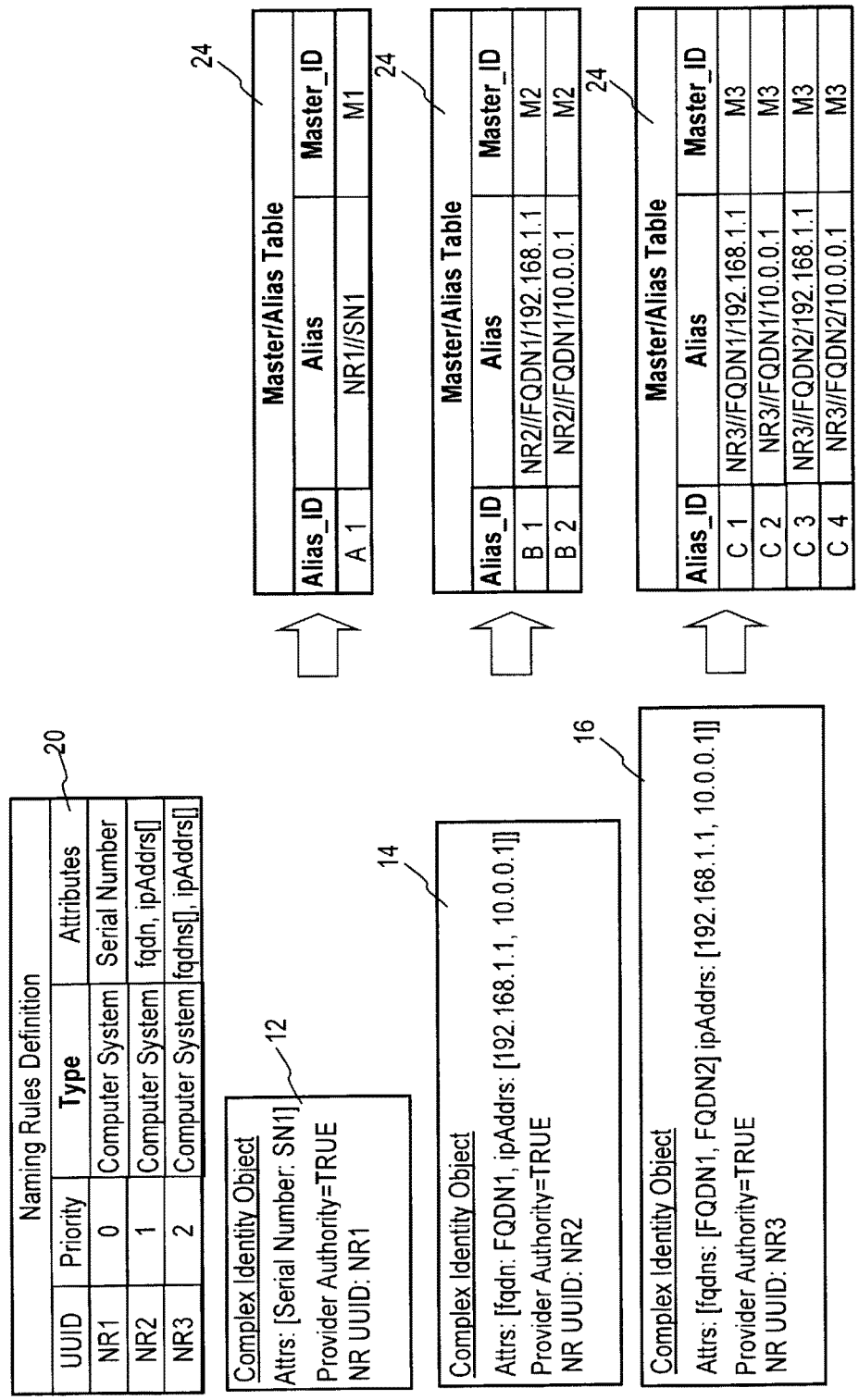
FIG. 7 is a schematic block diagram of an aliases generation process from different complex identity objects, in accordance with an embodiment of the present invention.

FIGS. 1 to 5 show a method for creating and handling identification for a resource in a configuration database, in accordance with an embodiment of the present invention. FIG. 6 shows a naming strategy based on complex identity objects, in accordance with an embodiment of the present invention; and FIG. 7 shows an aliases generation process from different complex identity objects, in accordance with an embodiment of the present invention.

Referring to FIGS. 1 to 6, the shown embodiments of the present invention employ a method for creating and handling identification for a resource in a configuration database. In step S100 the resource 10 is discovered. In step S110 a representation for the resource 10 is created comprising properties of the resource 10. In the shown embodiment, the managed element 10 as the resource comprises the properties "Class", "Name", "attrA1", "attrA2", "attrB1", "attrB2". In step S120, defined naming rules for the configuration database, each naming rule comprising a naming rule identification, a priority and at least one attribute having an attribute name, are determined and analyzed. In the shown embodiment (FIG. 6) a naming rule definitions table 20 comprises a first naming rule "NR1" with priority "0" and attributes "attrA1", "attrA2" and a second naming rule "NR2" with priority "1" and attributes "attrB1", "attrB2". In step S130, for each naming rule "NR1", "NR2" applicable to the resource 10, at least one attribute value A1, A2, B1, B2 for each attribute name "attrA1", "attrA2", "attrB1", "attrB2" is extracted from the resource representation as combination and/or transformation of properties "attrA1", "attrA2", "attrB1", "attrB2" of the resource 10. In step S140, for each naming rule applicable to the resource 10 a complex identity object 12, 14 is created, meaning an object containing naming rule identification NR1 and a list of attribute names and attribute values of the corresponding naming rule. In the shown embodiment (FIG. 6) a first complex identity object 12 created based on the first naming rule "NR1" contains a first attribute "attrA1" with the value "A1" and second attribute "attrA2" with the value "A2", and a second complex identity object 14 created based on the second naming rule "NR2" contains a third attribute "attrB1" with the value "B1" and a fourth attribute "attrB2" with the value "B2". In step S150, for each such created complex identity object 12, 14 an authority flag "Provider Authority" is set to "TRUE" if a given provider is able to obtain a complete set of values "A1", "A2", "B1", "B2" for the attributes "attrA1", "attrA2", "attrB1", "attrB2".

In step S200 (FIG. 2), the method is processing through each complex identity object 12, 14 according to priority "0", "1" of the corresponding naming rule "NR1", "NR2". In the shown embodiment the method starts the processing with the complex identity object with the highest priority, therefore processing is here started with the complex identity object 12. In step S210, an alias NR1//A1,A2; NR2//B1,B2 is generated for each result of a Cartesian product of each attribute value "A1", "A2", "B1", "B2" of the list of attribute names by concatenating the corresponding naming rule identification "NR1", "NR2" and the attribute values "A1", "A2", "B1", "B2". In step S210, each alias NR1//A1, A2; NR2//B1,B2 is stored in an aliases-in-memory list 25 together with the priority "0", "1" of a corresponding naming rule "NR1", "NR2" and an order number. In step S220, for each alias NR1//A1,A2; NR2//B1,B2 contained in the aliases-in-memory list 25 the configuration database is searched for a matching entry. In step S230, it is checked if a matching entry was found in the configuration database and whether the resource 10 is identical to an existing resource which is named with an identical existing alias in a master/alias table 24 in the configuration database. To find such a matching entry, each alias in the aliases-in-memory list 25 is compared with existing aliases stored in the master/alias table 24. Each entry is represented by a row in the master/alias table 24 containing an alias "Alias" and a related alias identification "Alias_ID" and a related master identification "Master_ID" of already existing resources in the configuration database. The configuration database comprises the master/alias table 24 and a managed-element table 22 containing entries for each managed element or resource 10 previously stored in the configuration database. Each entry of the managed-element table 22 contains a primary key and attributes like class, name etc. of a related managed element or resource 10. In an initial state, the managed-element table 22 and the master/alias table 24 are both empty.

Figure 3:
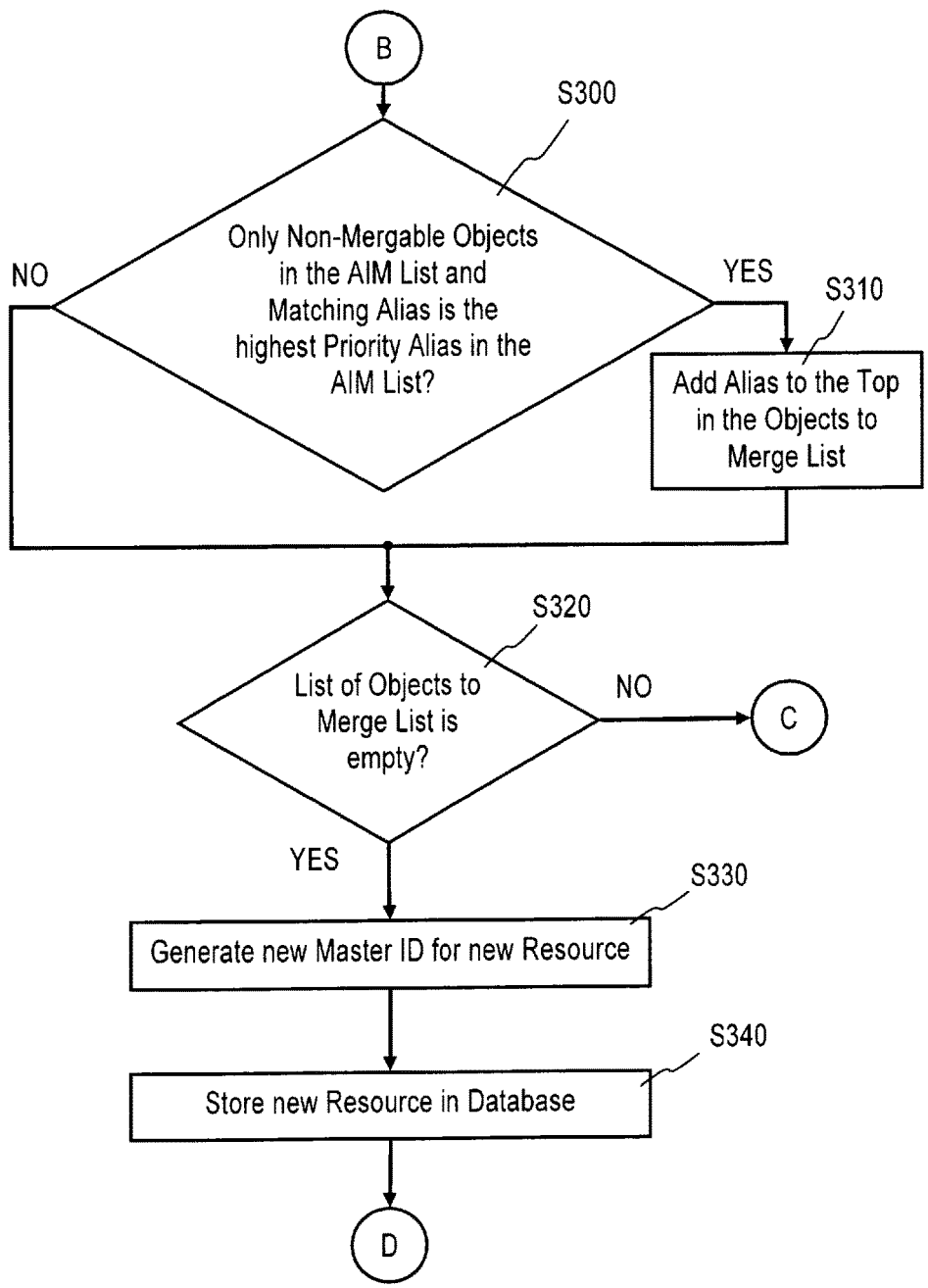

If no matches are found in the master/alias table 24 of the configuration database, the method continues with step S270. If matches are found in the master/alias table 24 of the configuration database, it is checked in step S240 if the matching entry, i.e. alias, in the master/alias table 24 of the configuration database, corresponds to the highest priority alias of the aliases-in-memory list 25. If the matching alias in the master/alias table 24 of the configuration database corresponds to the highest priority alias in the aliases-in-memory list 25, the master identification "Master_ID" of the matching alias is added to an objects-to-merge list 26 in step S250. If the matching alias in the master/alias table 24 of the configuration database corresponds not to the highest priority alias in the aliases-in-memory list 25, the master identification "Master_ID" of the matching alias is added to a non-mergable-objects list 28 in step S260. In step S270, it is checked, if more aliases are contained in the aliases-in-memory list 25. If more aliases are in the aliases-in-memory list 25, the method returns to step S220. If there are no more aliases in the aliases-in-memory list 25, the method continues with step S300 (FIG. 3).

In step S300, it is checked, if only non-mergable objects are contained in the aliases-in-memory list 25 and if the matching alias in the configuration database corresponds to the highest priority alias in the aliases-in-memory list 25. If the answer is "no", the method continues with step S320. If the answer is "yes", the master identification "Master_ID" of the matching alias in the master/alias table 24 of the configuration database is added to the top of the objects-to-merge list 26 in step S310. In step S320 it is checked, if the objects-to-merge list 26 is empty. If the objects-to-merge list 26 is not empty, the method continues with step S400 (FIG. 4).

In step S400, the master identification "Master_ID" of the first entry of the objects-to-merge list 26 is defined as a master identification "Master_ID" of the discovered resource 10. For any other entry in the objects-to-merge list 26, in step S410 a corresponding entry is generated in the master/alias table 24 of the configuration database using the master identification value of the objects-to-merge list entry as the alias identification value and the master identification value of the resource previously stored in the configuration database as a master identification value of the generated master/alias table entry.

In step S420, all resources or management elements contained as entries in the managed element table 22 and the discovered resource 10 are merged using a discovery date for the whole resource or each attribute of the corresponding resource separately, so the latest value is not overridden by the previous value. The method continues with step S500 (FIG. 5).

Returning to S320 (FIG. 3), if the objects-to-merge list 26 is empty, the method continues with step S330. In step S330, a master identification "Master_ID" is generated for the discovered resource 10. In step S340, the discovered resource 10 is stored in the managed-element table 22 of the configuration database, wherein the master identification "Master_ID" is used as a primary key. The method continues with step S500 (FIG. 5).

The steps S500 to S580 are performed for each alias from the aliases-in-memory list 25. In step S510, it is checked, if the alias is contained in the master/alias table 24 of the configuration database. If the alias is not found in the master/alias table 24 of the configuration database, the alias is inserted as an entry in the master/alias table 24 with the master identification of the discovered master identification in step S540, and the method proceeds with step S550. If the alias is found in the master/alias table 24 of the configuration database, it is checked in step S520, if the found alias belongs to the master identification of the discovered resource 10. If the found alias belongs to the master identification of the discovered resource 10, i.e. if the master identification value of the corresponding master/alias table entry containing the matching alias is the same as the master identification of the discovered resource, the method proceeds with step S550. If the alias does not belong to the master identification, the value of the master identification of the corresponding master/alias table entry containing the matching alias is switched to the master identification of the discovered resource 10 in step S530, and the method proceeds with step S550.

In step S550, it is checked, if all aliases for the corresponding complex identity object 12, 14 have been processed. If not all aliases for the corresponding complex identity object 12, 14 have been processed, the method proceeds with step S580. If all aliases for the corresponding complex identity object 12, 14 have been processed and the provider is declaring authority for the CIO, step S560, all other aliases for the master identification generated from this naming rule which are no longer present in the complex identity object 12, 14, are removed in step S570. In step S580, it is checked if more aliases in the aliases-in-memory list 25 are to be processed. If yes, the method takes the next alias of the aliases-in-memory list 25 and returns to step S510. If not, the method ends.

Referring to FIG. 7, one idea is based on using complex identity objects 12, 14, 16 associated with common data model instances, like managed elements 10 or resources and naming rules definition 20, to hold the information used to create an object identity in the similar way as it would be created by directly reading an object's attributes. A naming rule definition entry holds the following type of information: Globally unique identifier NR1, NR2, NR3 of the naming rule (e.g., UUID version 4), allowing to uniquely identify given definitions. The unique identifier NR1, NR2, NR3 should not be related to attributes used in the naming rule, or to object type(s), since such supported types might be extended and attribute names might be changed without changing the unique identifier, and without regeneration of the used aliases. Reference is made to the type(s) of managed elements types to which a naming rule is applicable. An attributes list "Attributes" with names of the attributes upon which the unique identification of the managed element will be built. The attributes names will be used against attributes provided in complex identity object 12, 14, 16 only to check validity of a complex identity instance, the global unique identifier itself is calculated from the attributes values provided in complex identity object 12, 14, 16 and their positions in the naming rule definition 20 along with the naming rule definition unique identifier UUID.

Naming rule cardinality with two possible values: single and multiple controlling a way in which array types of attributes comprising more than one value are treated when calculating aliases. If the cardinality of an attribute is single, there is only one alias calculated from the naming rule and the complex identity object, consisting of all the array elements of the attribute. If another complex identity object 12, 14, 16 has more or less values under an array type, the alias generated will be different. Additional sub-parameters might be also considered to differentiate whether the order of the attributes in the array is important or not. If order is not important, the aliases are calculated from sorted values. If order is important, an order set is used in the complex identity object 12, 14, 16. Priority is used in the same way as described in U.S. Pat. No. 8,290,949 B2, hereby incorporated herein by reference in its entirety, i.e. two objects are considered the same if a higher priority naming rule is matching even if lower priority naming rules are not matching.

The complex identity objects 12, 14, 16 hold a few types of the information: Reference to the naming rule definition 20 to be used for alias calculation. List of pairs of names and values—equivalent of object's attributes values, those might be a copy of a real object attributes values but this is not required, and object's attributes names. Names reflect names defined in the naming rule definition 20, for example. Other approaches might use e.g., only indexes of positions in the naming rule definition 20, instead of attribute names—but using names is less error prone. The provider's authority is a specific attribute of the complex identity object 12, 14, 16 in this approach. As it is possible to use array types for attribute values in the naming rule definition 20 and use them in the complex identity object 12, 14, 16, a data provider is able to inform whether his knowledge about state of the complex identity object 12, 14, 16 with respect to a given naming rule is complete, i.e. the data provider knows all available values and hence the data provider provides all available values of the given array attribute, e.g. the data provider knows all IP addresses for the given computer system, or whether his knowledge is not complete and the data provider might not be able to create all the values, e.g. the data provider is seeing only one IP address so will not create a complete set of IP addresses based on the complex identity objects 12, 14, 16 for a given computer system instance or resource.

The provider's authority is especially helpful in situations where a number of complex identities objects based on the same naming rule might change over the time for the managed element. For example, in an IP address based naming rule for a computer system some IP addresses might be removed from the computer system and might be associated with another computer system. When the data provider is able to claim his authority, the reconciliation algorithm is able to remove aliases generated for values which are no longer provided by the data provider with authority. If a complex identification object with the same value is later on associated with another managed element it will therefore not cause fail merge or over-merge with the managed element, which used to have the same complex identification object associated at some point of time in the past. At the same time another data provider being not able to claim authority is not able to remove other aliases for the same naming rule in situations when it is able to see only one instance. This would greatly reduce the chance for proper reconciliation with data from other data providers.

Instances of the complex identity objects 12, 14, 16 associated with a given managed element are not required to be persistable. Once used in the reconciliation process, only the value of the alias generated from the complex identity object 12, 14, 16 is stored in the master/alias table 24 along with the naming rule priority, provider's authority and provider identification.

Still referring to FIG. 7, the shown naming rule definition table 20 comprises three entries. A first naming rule "NR1" has priority "0" and the attribute "Serial Number", a second naming rule "NR2" has priority "1" and the attributes "fqdn", and "ipAddrs[ ]", and a third naming rule "NR3" has priority "2" and the attributes "fqdns[ ]", and "ipAddrs[ ]". According to step S140 of FIG. 1, for each applicable naming rule a new complex identity object 12, 14, 16 is created containing a naming rule identification and a list of attribute names and attribute values of the corresponding naming rule. In the shown embodiment, a first complex identity object 12 created based on the first naming rule "NR1" contains the attribute "Serial Number" with the value "SN1", and a second complex identity object 14 created based on the second naming rule "NR2" contains an attribute list containing the attribute "fqdn" with the value "FQDN1" and the attribute "ipAddrs" with the values "192.168.1.1, 10.0.0.1", and a third complex identity object 16 created based on the third naming rule "NR3" contains an attribute list containing the attribute "fqdns" with the values "FQDN1, FQDN2" and the attribute "ipAddrs" with the values "192.168.1.1, 10.0.0.1". According to step S150 of FIG. 1, for each complex identity object 12, 14, 16 an authority flag "Provider Authority" is set to "TRUE". According to step S210 of FIG. 2, for each complex identity object 12, 14, 16 a separate new alias name for each result of Cartesian product of each attribute value is generated by concatenating the corresponding naming rule identification and the attributes values.

So for the first complex identity object 12, a corresponding master/alias table 24 contains one entry with a first alias identification "A_1", a first alias name "NR1//SN1", and first master identification "M1". For the second complex identity object 14, a corresponding master/alias table 24 contains two entries, wherein a first entry contains a first alias identification "B_1", a first alias name "NR2//FQDN1/192.168.1.1", and first master identification "M2", and a second entry contains a second alias identification "B_2", a second alias name "NR2//FQDN1/10.0.0.1", and first master identification "M2". For the third complex identity object 16, a corresponding master/alias table 24 contains four entries, wherein a first entry contains a first alias identification "C_1", a first alias name "NR3//FQDN1/192.168.1.1", and first master identification "M3", a second entry contains a second alias identification "C_2", a second alias name "NR3//FQDN1/10.0.0.1", and first master identification "M3", a third entry contains a third alias identification "C_3", a third alias name "NR3//FQDN2/192.168.1.1", and first master identification "M3", and a fourth entry contains a fourth alias identification "C_4", a fourth alias name "NR3//FQDN2/10.0.0.1", and first master identification "M3".

FIGS. 8 to 16 show a first scenario of creating and handling identifications for resources in a configuration database, in accordance with an embodiment of the present invention.

Figure 8:
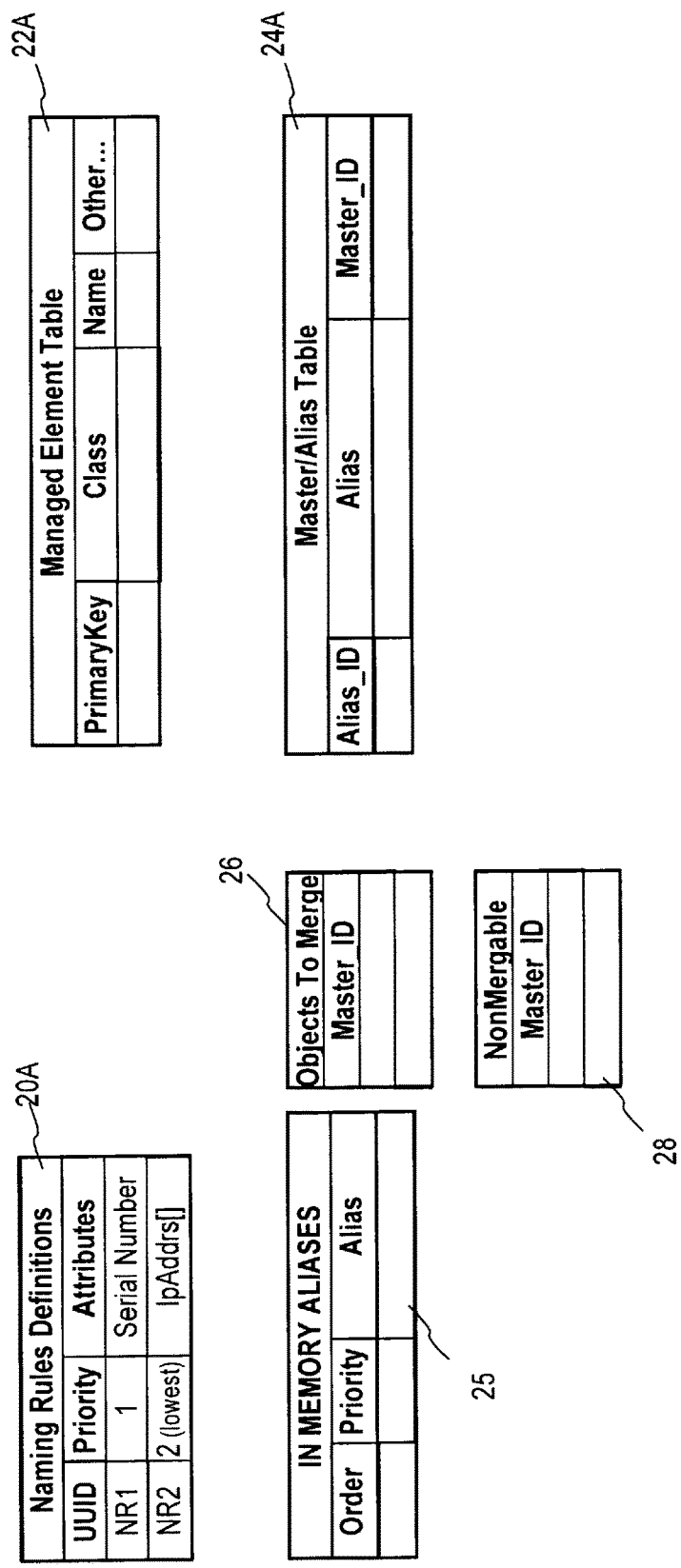
FIGS. 8 to 16 is one scenario of creating and handling identifications for resources in a configuration database, in accordance with an embodiment of the present invention.

Referring to FIG. 8, the first scenario uses the shown naming rule definition table 20A containing two entries. A first naming rule "NR1" has priority "1" and the attribute "Serial Number", and a second naming rule "NR2" has priority "2" and the attribute "ipAddrs[ ]". FIG. 8 shows initial states of corresponding managed element table 22A, master/alias table 24A, aliases-in-memory list 25, objects-to-merge list 26 and non-mergable objects list 28.

Figure 9:
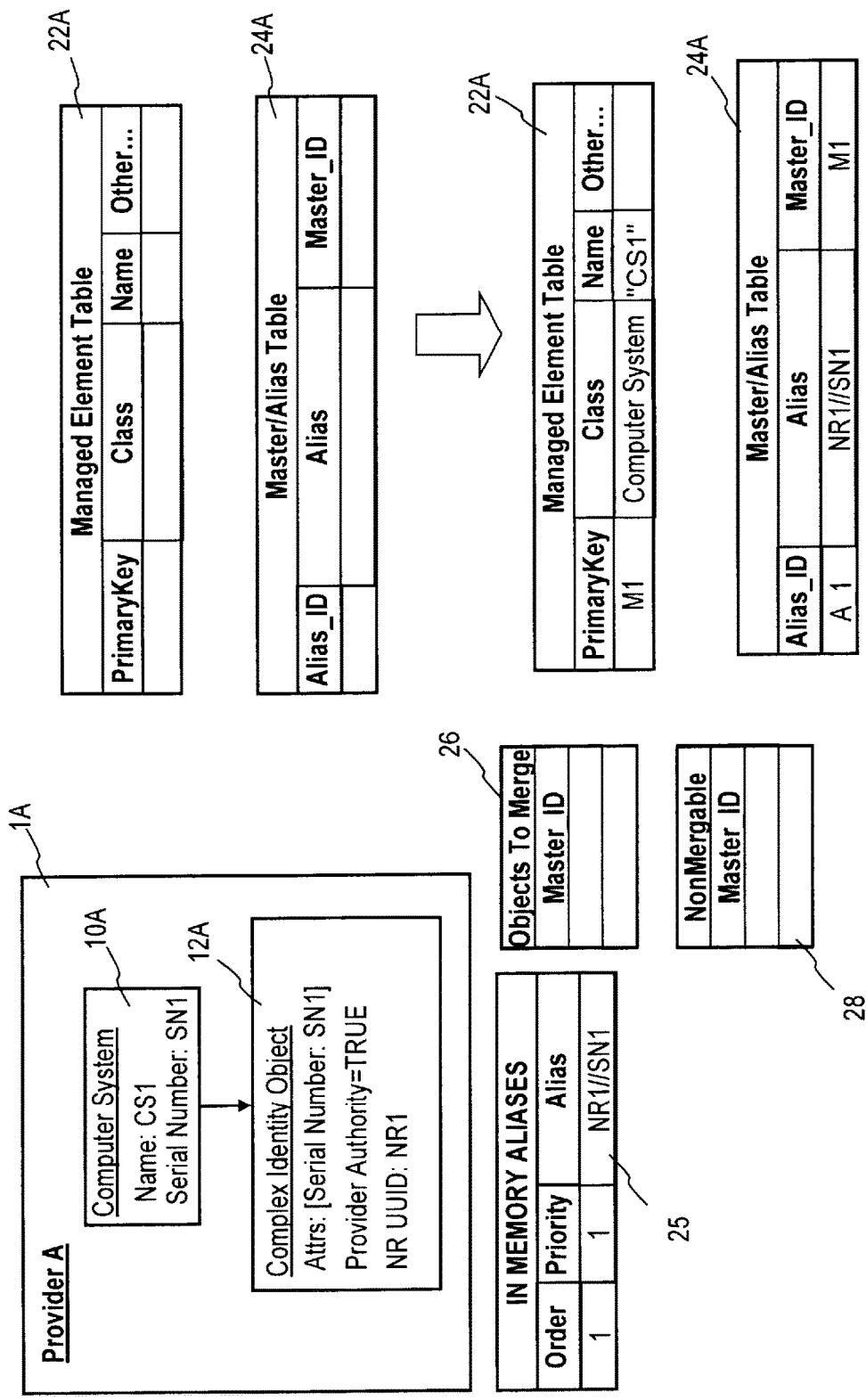

Referring to FIG. 9, according to steps S100 to S130 a managed element of a first data provider 1A is represented by a computer system 10A with name "CS1" and serial number "SN1". According to step S140 of FIG. 1, for the computer system 10A only the first naming rule "NR1" is applicable and a complex identity object 12A is created containing naming rule identification "NR1", attribute name "Serial Number" and attribute value "SN1". According to step S150 of FIG. 1, for the complex identity object 12A the authority flag "Provider Authority" is set "TRUE". According to steps S200 to S220 of FIG. 2, for the complex identity object 12A a separate new alias name "NR1//SN1" is generated and stored in the aliases-in-memory list 25. So the aliases-in-memory list 25 contains one entry with order number "1", priority "1", and alias name "NR1//SN1". According to steps S220 to S270, for each alias from the aliases-in-memory list 25 the configuration database is searched for matching entries. Since the alias "NR1//SN1" in the aliases-in-memory list 25 is the first and only insert, no matching entries are found.

In the shown state, the objects-to-merge list 26 and the non-mergable objects list 28 are both empty. Therefore, a new master identification "M1" for the new resource 10A is generated according to step S330 of FIG. 3, and stored in the managed-element table 22A of the configuration database according to step S340 of FIG. 3. So in the shown state the managed-element table 22A contains one entry with primary key "M1", type or class "computer system", and name "CS1". According to steps S500 to S580 of FIG. 5, the alias "NR1//SN1" is inserted with alias identification "A_1" and master identification "M1" as entry in the master/alias table 24A.

Figure 10:
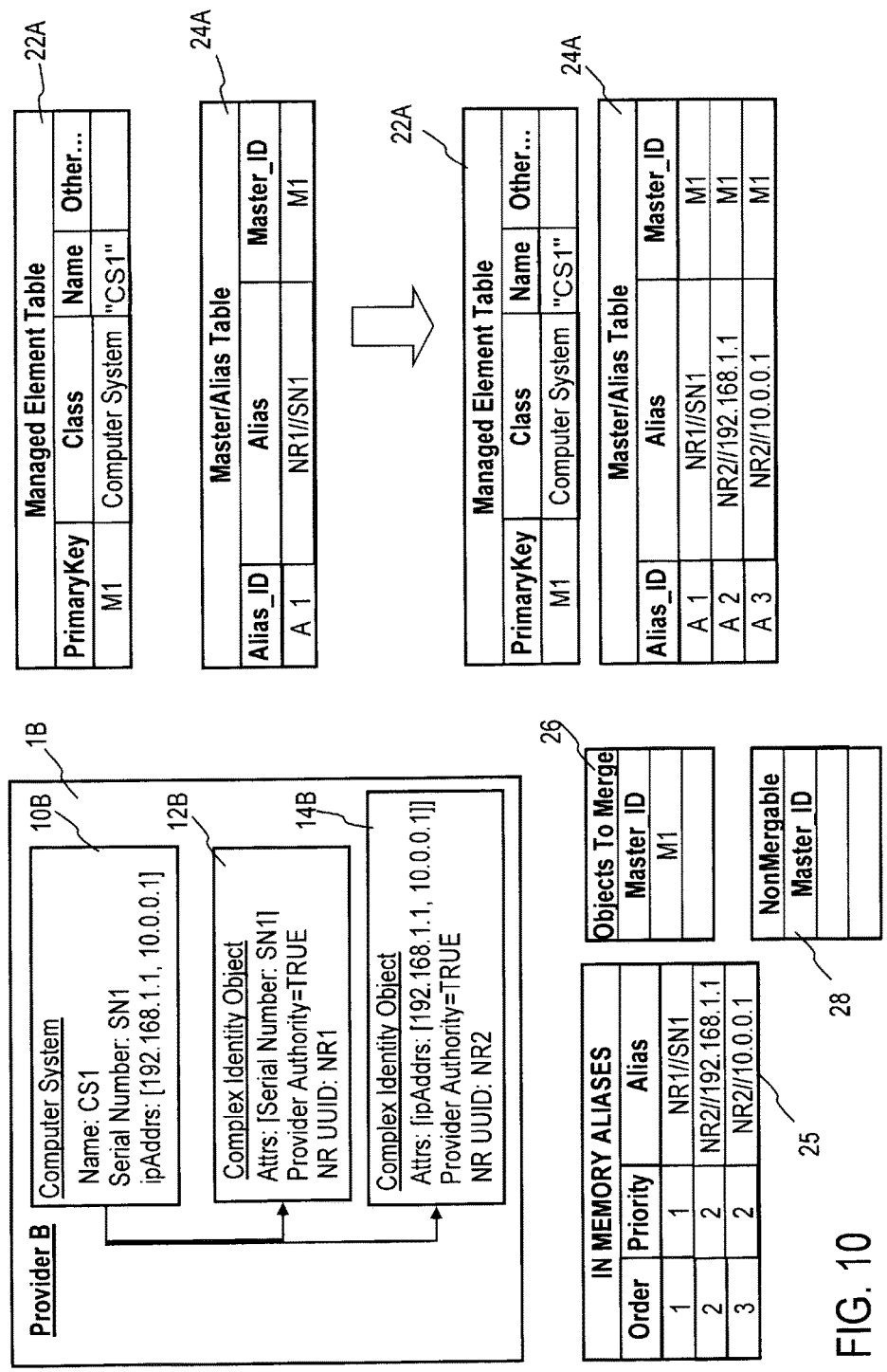

Referring to FIG. 10, according to steps S100 to S130 a managed element of a second data provider 1B is represented by a computer system 10B with name "CS1", serial number "SN1", and IP addresses "190.168.1.1" and "10.0.0.1". According to step S140 of FIG. 1, for the computer system 10B both naming rules "NR1", "NR2" are applicable and two complex identity objects 12B, 14B are created. A first complex identity objects 12B contains naming rule identification "NR1", attribute name "Serial Number" and attribute value "SN1", and a second complex identity objects 14B contains naming rule identification "NR2", attribute name "ipAddrs" and attribute values "192.168.1.1", "10.0.0.1". According to step S150 of FIG. 1, for both complex identity objects 12B, 14B the corresponding authority flag "Provider Authority" is set "TRUE."

Figure 2:
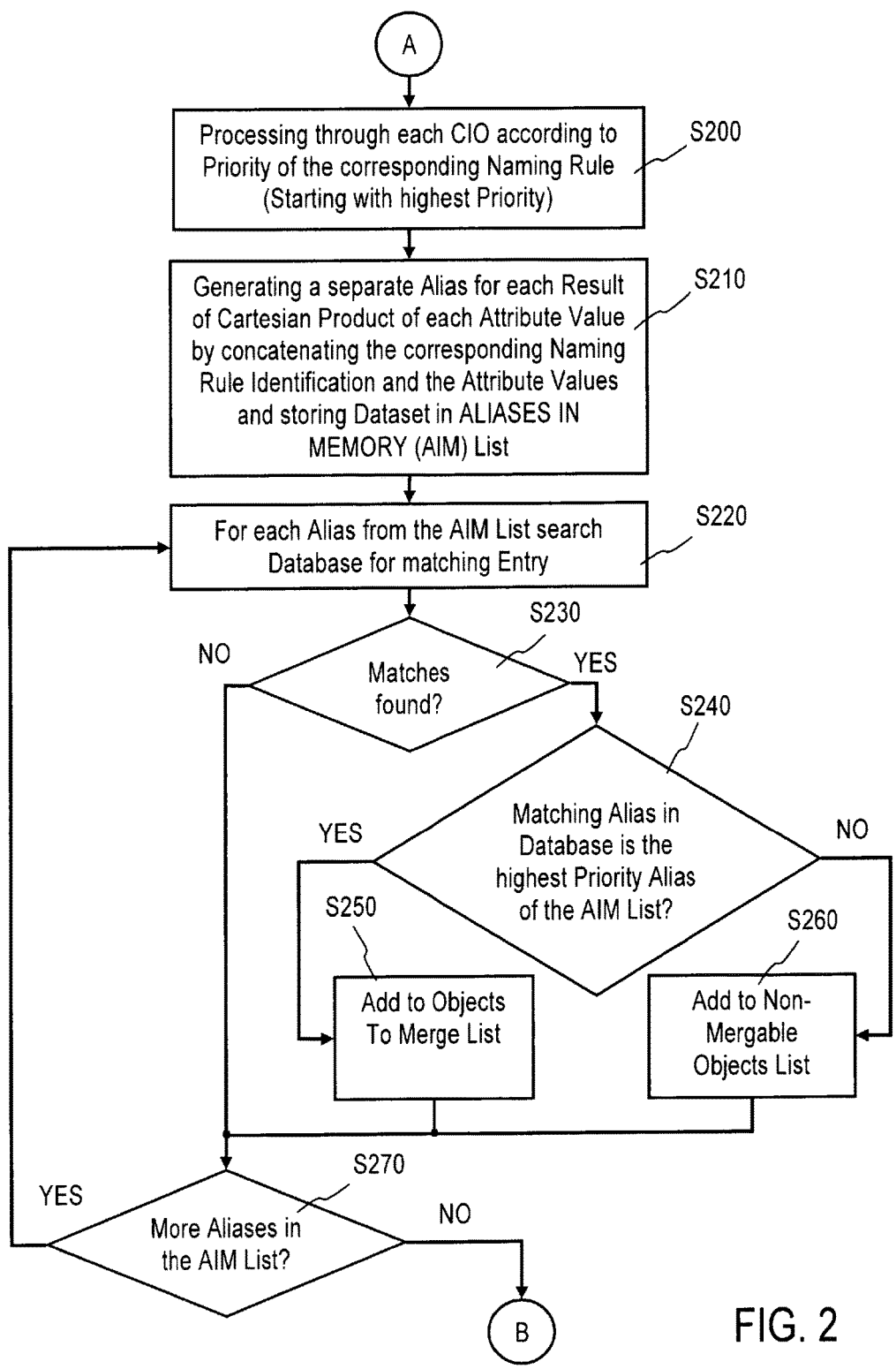

According to steps S200 to S220 of FIG. 2, for the first complex identity object 12B a separate new alias name "NR1//SN1" is generated and stored in the aliases-in-memory list 25, and for the second complex identity object 14B two separate new alias names "NR2//192.168.1.1", "NR2//10.0.0.1" are generated and stored in the aliases-in-memory list 25. So the aliases-in-memory list 25 contains three entries. A first entry with order number "1", priority "1", and alias name "NR1//SN1", second entry with order number "2", priority "2", and alias name "NR2//192.168.1.1", and a third entry with order number "3", priority "2", and alias name "NR2//10.0.0.1". According to steps S220 to S270, for the first alias "NR1//SN1" from the aliases-in-memory list 25 a matching entry with alias identification A_1 is found in the master/alias table 24A of the configuration database. Since the matching alias "NR1//SN1" in the configuration database is the highest priority alias of the aliases-in-memory list 25, the master identification "M1" of the matching entry is added to the objects-to-merge list 26, according to step S250 of FIG. 2.

According to steps S220 to S270, for the other aliases "NR2//192.168.1.1", "NR2//10.0.0.1" from the aliases-in-memory list 25 no matching entries are found in the master/alias table 24A of the configuration database. Since class or type and name of the computer system 10B of the second provider 1B are the same as for the computer system 10A of the first provider 1A, the object to merge list 26 is not empty and the master identification "M1" is defined as a master identification of the first object from the objects-to-merge list 26, according to step S400 of FIG. 4. According to step S420 all resources or management element table entries with master identification "M1" are merged using a discovery date. Therefore, the entry in the managed element table 22A with master identification "M1" as primary key, "computer system" as class or type, and "CS1" as name is not changed. According to steps S500 to S580 of FIG. 5, since the alias "NR1//SN1" is already an entry in the master/alias table 24A only the other aliases "NR2//192.168.1.1", "NR2//10.0.0.1" from the aliases-in-memory list 25 are inserted with alias identification "A_2", "A_3" and master identification "M1" as entries in the master/alias table 24A.

Figure 11:
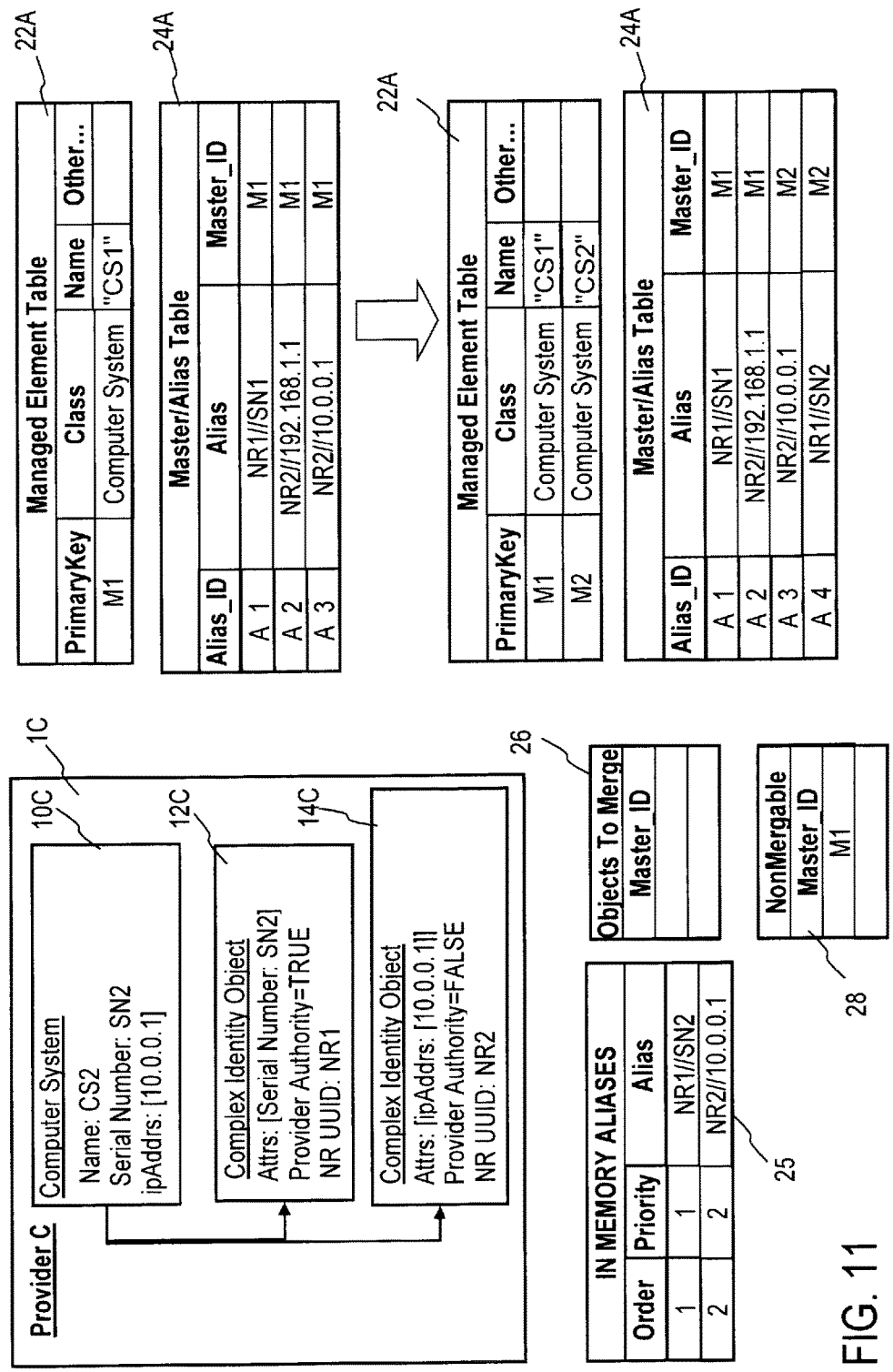

Referring to FIG. 11, according to steps S100 to S130 a managed element of a third data provider 1C is represented by a computer system 10C with name "CS2", serial number "SN2", and IP address "10.0.0.1". According to step S140 of FIG. 1, for the computer system 10C both naming rules "NR1", "NR2" are applicable and two complex identity objects 12C, 14C are created. A first complex identity object 12C contains naming rule identification "NR1", attribute name "Serial Number" and attribute value "SN2", and a second complex identity object 14C contains naming rule identification "NR2", attribute name "ipAddrs" and attribute value "10.0.0.1". According to step S150 of FIG. 1, for the first complex identity object 12C the corresponding authority flag "Provider Authority" is set "TRUE", and for the second complex identity object 14C the corresponding authority flag "Provider Authority" is set "FALSE". According to steps S200 to S220 of FIG. 2, for the first complex identity object 12C a separate new alias name "NR1//SN2" is generated and stored in the aliases-in-memory list 25, and for the second complex identity object 14C a separate new alias name "NR2//10.0.0.1" is generated and stored in the aliases-in-memory list 25.

So the aliases-in-memory list 25 contains two entries. A first entry with order number "1", priority "1", and alias name "NR1//SN2", and a second entry with order number "2", priority "2", and alias name "NR2//10.0.0.1". According to steps S220 to S270, for the first alias "NR1//SN1" from the aliases-in-memory list 25 no matching entry is found in the master/alias table 24A of the configuration database. According to steps S220 to S270, for the second alias "NR2//10.0.0.1" from the aliases-in-memory list 25 a matching entry with alias identification A_3 is found in the master/alias table 24A. Since the matching alias "NR2//10.0.0.1" in the configuration database is not the highest priority alias of the aliases-in-memory list 25, the master identification "M1" of the matching entry is added to the non-mergable objects list 28, according to step S260 of FIG. 2. Since the objects-to-merge list 26 is empty, a new master identification "M2" is generated for the new resource 10C according to step S330 of FIG. 3, and stored in the managed element table 22A of the configuration database according to step S340 of FIG. 3.

So in the shown state the managed element table 22A contains two entries; a first entry with primary key "M1", type or class "computer system", and name "CS1", and a second entry with primary key "M2", type or class "computer system", and name "CS2". According to steps S500 to S580 of FIG. 5, the first alias "NR1//SN2" of the aliases-in-memory list 25 is inserted with alias identification "A_4" and master identification "M2" as an entry in the master/alias table 24A. According to steps S500 to S580 of FIG. 5, the second alias "NR2//10.0.0.1" of the aliases-in-memory list 25 was found in the configuration database and the matching alias "A_3" belongs not to the master identification "M2" of the second alias "NR2//10.0.0.1". Therefore, the master identification "M1" of the matching alias "A_3" is switched to the new master identification "M2" according to step S530.

Figure 12:
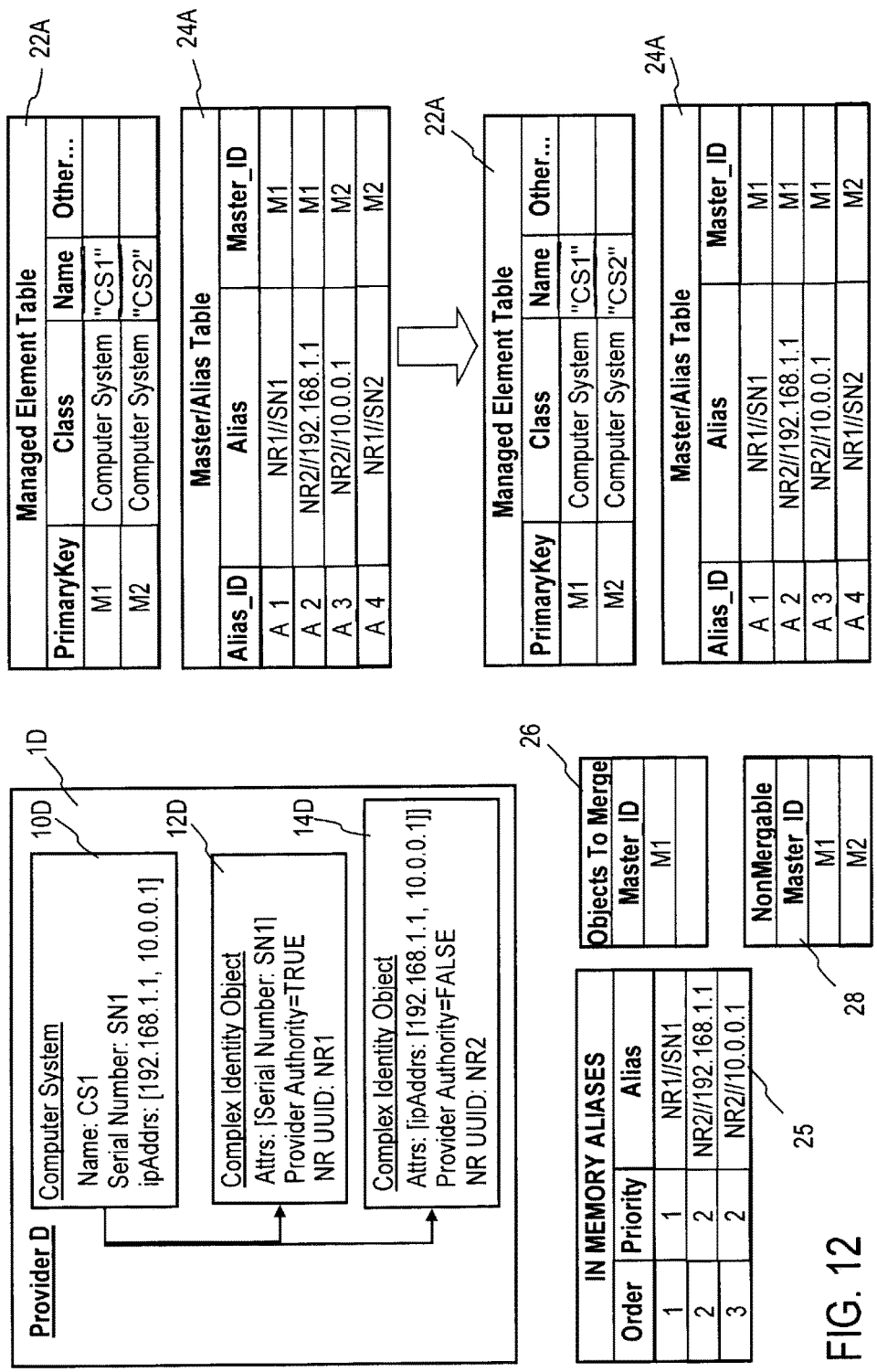

Referring to FIG. 12, according to steps S100 to S130 a managed element of a fourth data provider 1D is represented by a computer system 10D with name "CS1", serial number "SN1", and IP addresses "190.168.1.1" and "10.0.0.1". According to step S140 of FIG. 1, for the computer system 10D both naming rules "NR1", "NR2" are applicable and two complex identity objects 12D, 14D are created. A first complex identity object 12D contains naming rule identification "NR1", attribute name "Serial Number" and attribute value "SN1", and a second complex identity objects 14D contains naming rule identification "NR2", attribute name "ipAddrs" and attribute values "192.168.1.1", "10.0.0.1". According to step S150 of FIG. 1, for the first complex identity object 12D the corresponding authority flag "Provider Authority" is set "TRUE", and for the second complex identity object 14D the corresponding authority flag "Provider Authority" is set "FALSE".

According to steps S200 to S220 of FIG. 2, for the first complex identity object 12D a separate new alias name "NR1//SN1" is generated and stored in the aliases-in-memory list 25, and for the second complex identity object 14D two separate new alias names "NR2//192.168.1.1", "NR2//10.0.0.1" are generated and stored in the aliases-in-memory list 25. So the aliases-in-memory list 25 contains three entries. According to steps S220 to S270, for the first alias "NR1//SN1" from the aliases-in-memory list 25 a matching entry with alias identification A_1 is found in the master/alias table 24A of the configuration database. Since the matching alias "NR1//SN1" in the configuration database is the highest priority alias of the aliases-in-memory list 25, the master identification "M1" of the matching entry is add to the objects-to-merge list 26, according to step S250 of FIG. 2.

According to steps S220 to S270, for the second alias "NR2//192.168.1.1" from the aliases-in-memory list 25 a matching entry with alias identification A_2 is found in the master/alias table 24A. Since the matching alias "NR2//192.168.1.1" in the configuration database is not the highest priority alias of the aliases-in-memory list 25, the master identification "M1" of the matching entry is added to the non-mergable objects list 28, according to step S260 of FIG. 2. According to steps S220 to S270, for the third alias "NR2//10.0.0.1" from the aliases-in-memory list 25 a matching entry with alias identification A_3 is found in the master/alias table 24A. Since the matching alias "NR2//10.0.0.1" in the configuration database is not the highest priority alias of the aliases-in-memory list 25, the master identification "M2" of the matching entry is added to the non-mergable objects list 28, according to step S260 of FIG. 2. Since class or type and name of the computer system 10D of the fourth provider 1D are the same as for the computer systems 10A and 10B of the first and second provider 1A, 1B the object to merge list 26 is not empty and the master identification "M1" is defined as the master identification of the first object from the objects-to-merge list 26, according to step S400 of FIG. 4.

According to step S420 all resource elements representations with master identification "M1" are merged using a discovery date. Therefore, the entry in the managed element table 22A with master identification "M1" as primary key, "computer system" as class or type, and "CS1" as name is not changed. According to steps S500 to S580 of FIG. 5, all aliases "NR1//SN1", "NR2//192.168.1.1", "NR2//10.0.0.1" from the aliases-in-memory list 25 are found in the master/alias table 24A of the configuration database. Since the first alias "NR1//SN1" and the second alias "NR2//192.168.1.1" from the aliases-in-memory list 25 are already entries in the master/alias table 24A and belong to the master identification "M1" of the matching entries "A_1", "A_2" the matching entries "A_1", "A_2" in the master/alias table 24A are not modified. Since the third alias "NR2//10.0.0.1" from the aliases-in-memory list 25 does not belong to master identification "M2" of the matching alias "A_3", the master identification "M2" of the matching alias "A_3" in the master/alias table 24A is switched to the new master identification "M1" according to step S530.

Figure 13:
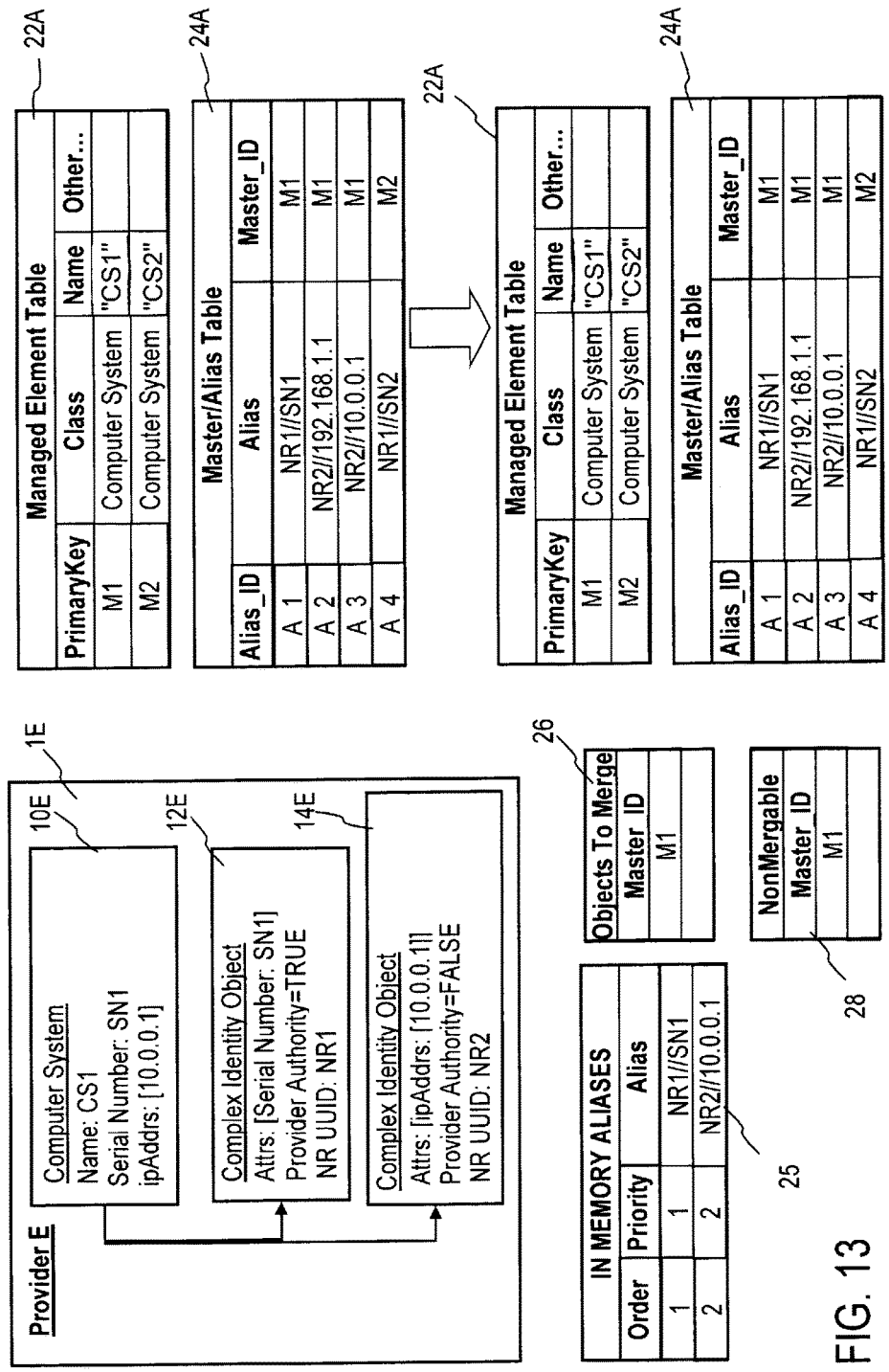

Referring to FIG. 13, according to steps S100 to S130 a managed element of a fifth data provider 1E is represented by a computer system 10E with name "CS1", serial number "SN1", and IP address "10.0.0.1". According to step S140 of FIG. 1, for the computer system 10E both naming rules "NR1", "NR2" are applicable and two complex identity objects 12E, 14E are created. A first complex identity object 12E contains naming rule identification "NR1", attribute name "Serial Number" and attribute value "SN1", and a second complex identity object 14E contains naming rule identification "NR2", attribute name "ipAddrs" and attribute value "10.0.0.1". According to step S150 of FIG. 1, for the first complex identity object 12E the corresponding authority flag "Provider Authority" is set "TRUE", and for the second complex identity object 14E the corresponding authority flag "Provider Authority" is set "FALSE".

According to steps S200 and S210 of FIG. 2, for the first complex identity object 12E a separate new alias name "NR1//SN1" is generated and stored in the aliases-in-memory list 25, and for the second complex identity object 14E a separate new alias name "NR2//10.0.0.1" is generated and stored in the aliases-in-memory list 25. So the aliases-in-memory list 25 contains two entries. According to steps S220 to S270, for the first alias "NR1//SN1" from the aliases-in-memory list 25 a matching entry with alias identification A_1 is found in the master/alias table 24A of the configuration database. Since the matching alias "NR1//SN1" in the configuration database is the highest priority alias of the aliases-in-memory list 25, the master identification "M1" of the matching entry is added to the objects-to-merge list 26, according to step S250 of FIG. 2. According to steps S220 to S270, for the second alias "NR2//10.0.0.1" from the aliases-in-memory list 25 a matching entry with alias identification A_3 is found in the master/alias table 24A. Since the matching alias "NR2//10.0.0.1" in the configuration database is not the highest priority alias of the aliases-in-memory list 25, the master identification "M1" of the matching entry is added to the non-mergable objects list 28, according to step S260 of FIG. 2.

Since class or type and name of the computer system 10E of the fifth provider 1E are the same as for the computer systems 10A, 10B and 10D of the first, second, and fourth provider 1A, 1B, and 1D the object to merge list 26 is not empty and the master identification "M1" is defined as a master identification of the first object from the objects-to-merge list 26, according to step S400 of FIG. 4. According to step S420 all resources or management element table entries with master identification "M1" are merged using a discovery date. Therefore, the entry in the managed element table 22A with master identification "M1" as primary key, "computer system" as class or type, and "CS1" as name is not changed. According to steps S500 to S580 of FIG. 5, all aliases "NR1//SN1", "NR2//10.0.0.1" from the aliases-in-memory list 25 are found in the master/alias table 24A of the configuration database. Since the first alias "NR1//SN1" and the second alias "NR2//10.0.0.1" from the aliases-in-memory list 25 are already entries in the master/alias table 24A and belong to the master identification "M1" of the matching entries "A_1", "A_3" the matching entries "A_1", "A_3" in the master/alias table 24A are not modified.

Figure 14:
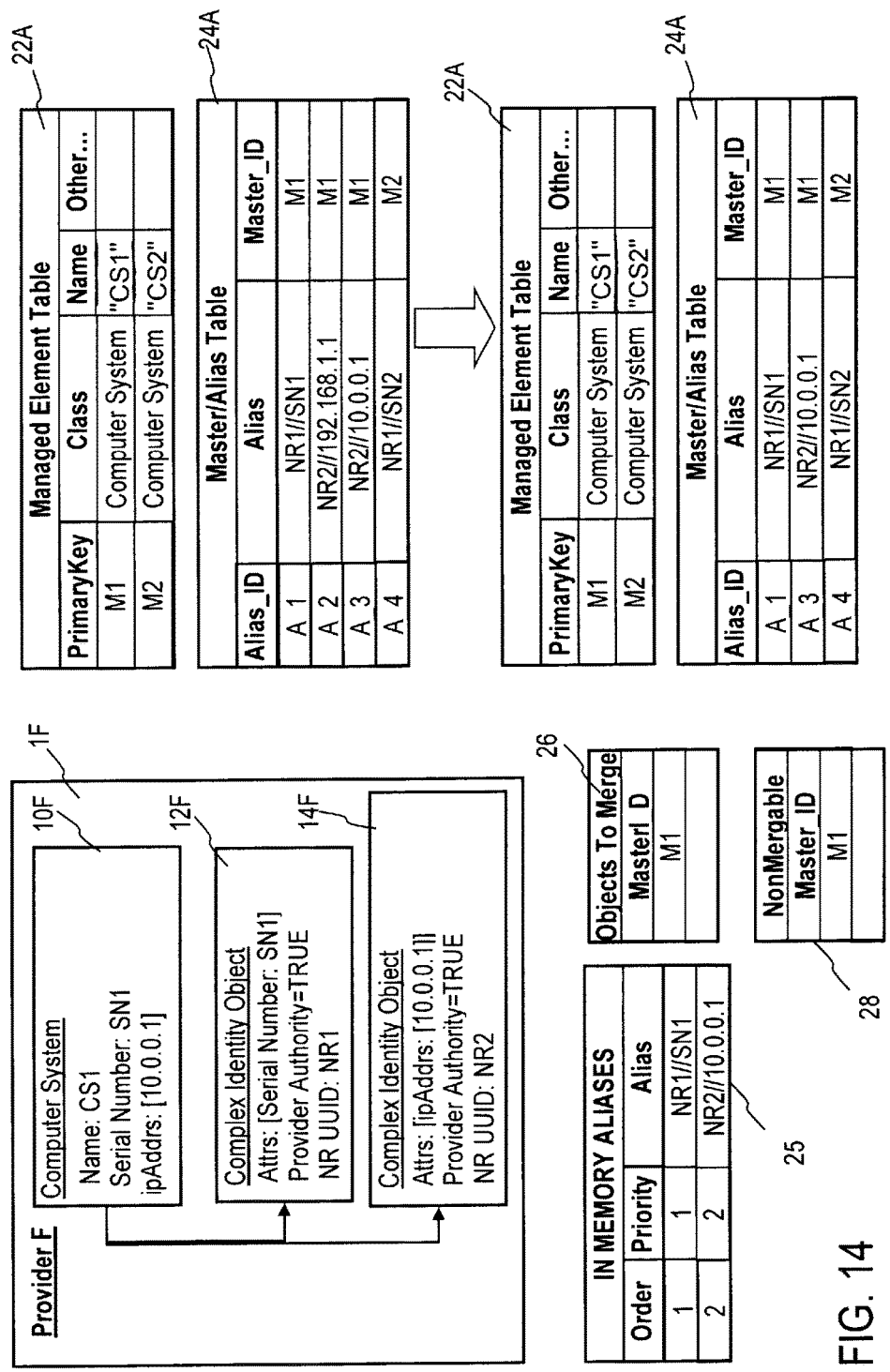

Referring to FIG. 14, according to steps S100 to S130 a managed element of a sixth data provider 1F is represented by a computer system 10F with name "CS1", serial number "SN1", and IP address "10.0.0.1". According to step S140 of FIG. 1, for the computer system 10F both naming rules "NR1", "NR2" are applicable and two complex identity objects 12F, 14F are created. A first complex identity object 12F contains naming rule identification "NR1", attribute name "Serial Number" and attribute value "SN1", and a second complex identity object 14F contains naming rule identification "NR2", attribute name "ipAddrs" and attribute value "10.0.0.1". According to step S150 of FIG. 1, for both complex identity objects 12F, 14F the corresponding authority flag "Provider Authority" is set "TRUE". According to steps S200 to S220 of FIG. 2, for the first complex identity object 12F a separate new alias name "NR1//SN1" is generated and stored in the aliases-in-memory list 25, and for the second complex identity object 14F a separate new alias name "NR2//10.0.0.1" is generated and stored in the aliases-in-memory list 25. So the aliases-in-memory list 25 contains two entries. According to steps S220 to S270, for the first alias "NR1//SN1" from the aliases-in-memory list 25 a matching entry with alias identification A_1 is found in the master/alias table 24A of the configuration database. Since the matching alias "NR1//SN1" in the configuration database is the highest priority alias of the aliases-in-memory list 25, the master identification "M1" of the matching entry is add to the objects-to-merge list 26, according to step S250 of FIG. 2.

According to steps S220 to S270, for the second alias "NR2//10.0.0.1" from the aliases-in-memory list 25 a matching entry with alias identification A_3 is found in the master/alias table 24A. Since the matching alias "NR2//10.0.0.1" in the configuration database is not the highest priority alias of the aliases-in-memory list 25, the master identification "M1" of the matching entry is added to the non-mergable objects list 28, according to step S260 of FIG. 2. Since class or type and name of the computer system 10F of the sixth provider 1F are the same as for the computer systems 10A, 10B, 10D and 10E of the first, second, fourth and fifth provider 1A, 1B, 1D and 1E the object to merge list 26 is not empty and the master identification "M1" is defined as master identification of the first object from the objects-to-merge list 26, according to step S400 of FIG. 4. According to step S420 all resources or management element table entries with master identification "M1" are merged using discovery date. Therefore, the entry in the managed element table 22A with master identification "M1" as primary key, "computer system" as class or type, and "CS1" as name is not changed.

According to steps S500 to S580 of FIG. 5, all aliases "NR1//SN1", "NR2//10.0.0.1" from the aliases-in-memory list 25 are found in the master/alias table 24A of the configuration database. Since the first alias "NR1//SN1" and the second alias "NR2//10.0.0.1" from the aliases-in-memory list 25 are already entries in the master/alias table 24A and belong to the master identification "M1" of the matching entries "A_1", "A_3" the matching entries "A_1", "A_3" in the master/alias table 24A are not modified. Since the sixth provider 1F declares authority for the second complex identity object 14F, the alias with the alias identity A_2 is removed from the master/alias table 24A, because the attribute value "192.168.1.1" on which the alias "NR2//192.168.1.1" is based, is no longer present in the second complex identity object 14F.

Figure 15:
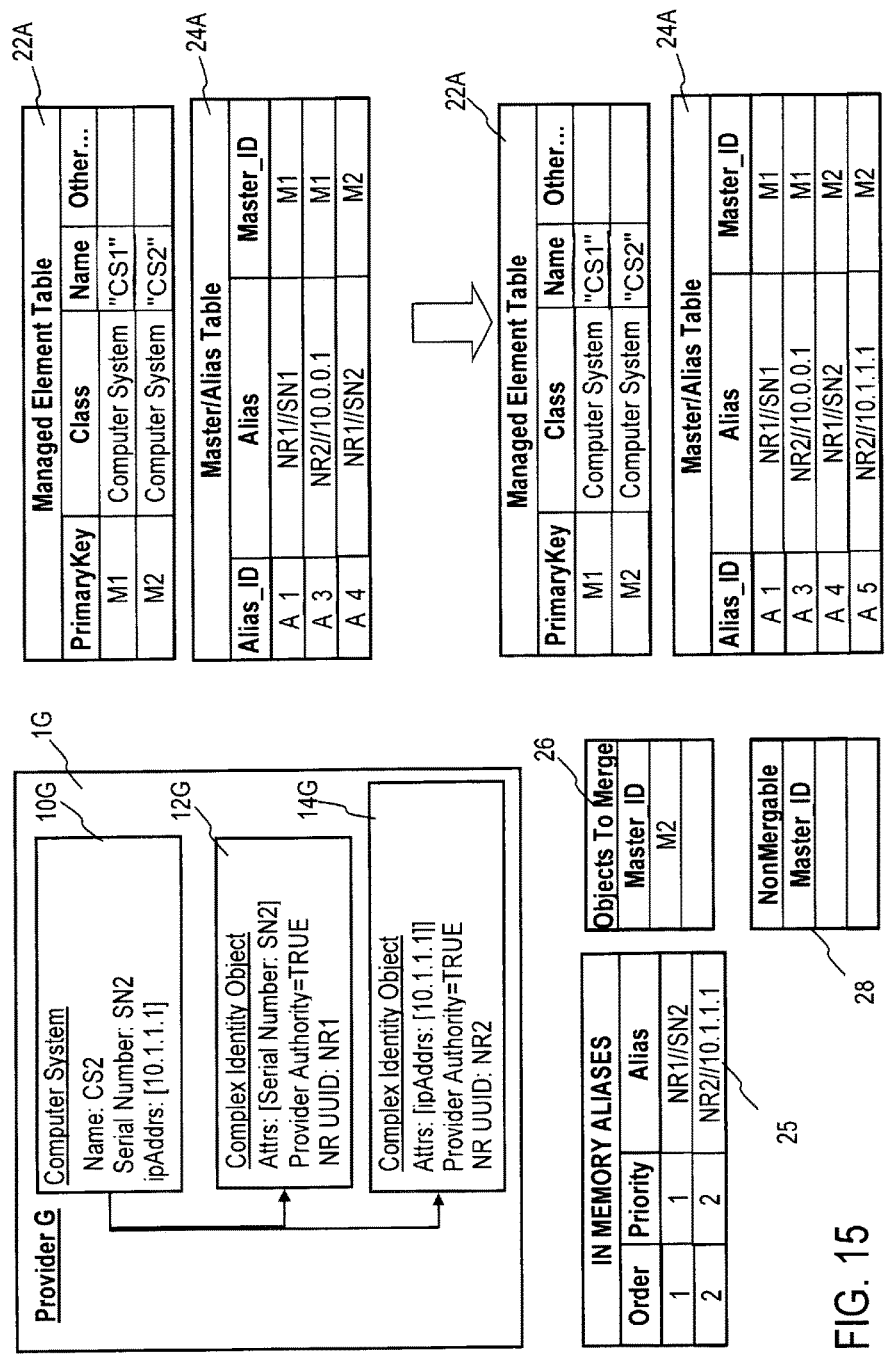

Referring to FIG. 15, according to steps S100 to S130 a managed element of a seventh data provider 1G is represented by a computer system 10G with name "CS2", serial number "SN2", and IP address "10.1.1.1". According to step S140 of FIG. 1, for the computer system 10G both naming rules "NR1", "NR2" are applicable and two complex identity objects 12G, 14G are created. A first complex identity object 12G contains naming rule identification "NR1", attribute name "Serial Number" and attribute value "SN2", and a second complex identity objects 14G contains naming rule identification "NR2", attribute name "ipAddrs" and attribute value "10.1.1.1". According to step S150 of FIG. 1, for both complex identity objects 12G, 14G the corresponding authority flag "Provider Authority" is set "TRUE".

According to steps S200 to S220 of FIG. 2, for the first complex identity object 12G a separate new alias name "NR1//SN2" is generated and stored in the aliases-in-memory list 25, and for the second complex identity object 14G a separate new alias name "NR2//10.1.1.1" is generated and stored in the aliases-in-memory list 25. So the aliases-in-memory list 25 contains two entries. According to steps S220 to S270, for the first alias "NR1//SN2" from the aliases-in-memory list 25 a matching entry with alias identification A_4 is found in the master/alias table 24A of the configuration database. Since the matching alias "NR1//SN2" in the configuration database is the highest priority alias of the aliases-in-memory list 25, the master identification "M2" of the matching entry is added to the objects-to-merge list 26, according to step S250 of FIG. 2. According to steps S220 to S270, for the second alias "NR2//10.1.1.1" from the aliases-in-memory list 25 no matching entries are found in the master/alias table 24A of the configuration database. Since class or type and name of the computer system 10G of the seventh provider 1G are the same as for the computer systems 10C of the third provider 1C the object to merge list 26 is not empty and the master identification "M2" is defined as master identification of the first object from the objects-to-merge list 26, according to step S400 of FIG. 4.

According to step S420 all resources or management element table entries with master identification "M2" are merged using a discovery date. Therefore, the entry in the managed element table 22A with master identification "M2" as primary key, "computer system" as class or type, and "CS2" as name is not changed. According to steps S500 to S580 of FIG. 5, the first alias "NR1//SN2" from the aliases-in-memory list 25 is found in the master/alias table 24A of the configuration database. Since the first alias "NR1//SN2" from the aliases-in-memory list 25 is already an entry in the master/alias table 24A and belongs to the master identification "M2" of the matching entry "A_4", the matching entry "A_4" in the master/alias table 24A is not modified. According to steps S500 to S580 of FIG. 5, the second alias is not found in the configuration database, and therefore, the second alias "NR2//10.1.1.1" from the aliases-in-memory list 25 is inserted with alias identification "A_5", and master identification "M2" as entry in the master/alias table 24A.

Figure 16:
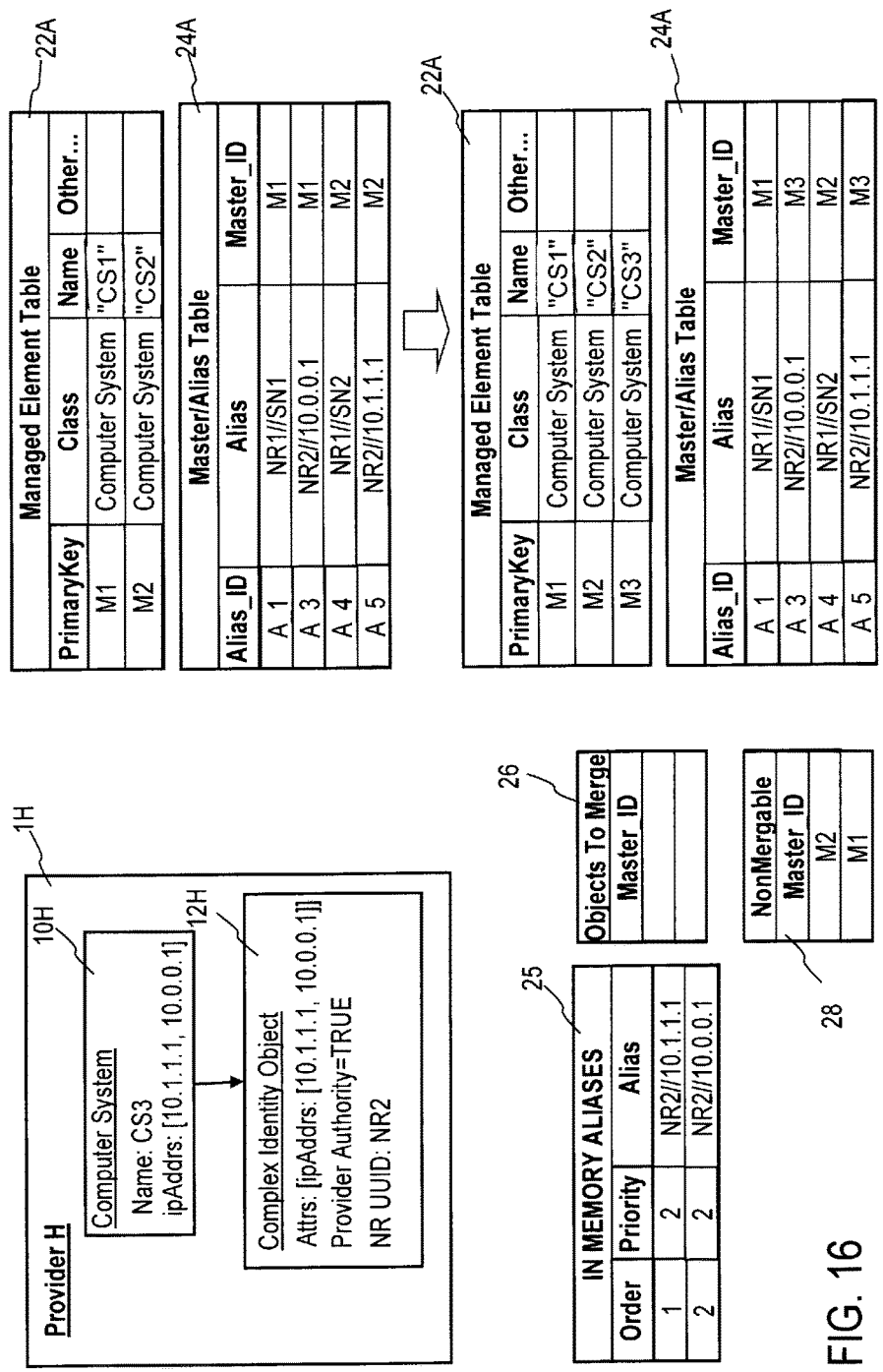

Referring to FIG. 16, according to steps S100 to S130 a managed element of a eighth data provider 1H is represented by a computer system 10H with name "CS3", and IP addresses "10.1.1.1", "10.0.0.1". According to step S140 of FIG. 1, for the computer system 10H the second naming rules "NR2" is applicable and one complex identity objects 12H is created, containing naming rule identification "NR2", attribute name "ipAddrs" and attribute values "10.1.1.1", "10.0.0.1". According to step S150 of FIG. 1, for the complex identity objects 12H the corresponding authority flag "Provider Authority" is set "TRUE". According to steps S200 to S220 of FIG. 2, for the complex identity object 12H two separate new alias names "NR2//10.1.1.1", "NR2//10.0.0.1" are generated and stored in the aliases-in-memory list 25. So the aliases-in-memory list 25 contains two entries. A first entry with order number "1", priority "2", and alias name "NR2//10.1.1.1", and a second entry with order number "2", priority "2", and alias name "NR2//10.0.0.1".

According to steps S220 to S270, for the first alias "NR2//10.1.1.1" from the aliases-in-memory list 25 a matching entry with alias identification A_5 is found in the master/alias table 24A. Since the matching alias "NR2//10.1.1.1" in the configuration database is not the highest priority alias of the aliases-in-memory list 25, the master identification "M2" of the matching entry is added to the non-mergable objects list 28, according to step S260 of FIG. 2. According to steps S220 to S270, for the second alias "NR2//10.0.0.1" from the aliases-in-memory list 25 a matching entry with alias identification A_3 is found in the master/alias table 24A. Since the matching alias "NR2//10.0.0.1" in the configuration database is not the highest priority alias of the aliases-in-memory list 25, the master identification "M1" of the matching entry is added to the non-mergable objects list 28, according to step S260 of FIG. 2.

Since the objects-to-merge list 26 is empty, a new master identification "M3" is generated for the new resource 10H according to step S330 of FIG. 3, and stored in the managed element table 22A of the configuration database according to step S340 of FIG. 3. So in the shown state the managed element table 22A contains three entries; a first entry with primary key "M1", type or class "computer system", and name "CS1", a second entry with primary key "M2", type or class "computer system", and name "CS2", and a third entry with primary key "M3", type or class "computer system", and name "CS3". According to steps S500 to S580 of FIG. 5, the first alias "NR2//10.1.1.1" of the aliases-in-memory list 25 was found in the configuration database and the matching alias "A_3" does not belong to the master identification "M3" of the first alias "NR2//10.1.1.1". Therefore, the master identification "M1" of the matching alias "A_3" is switched to the new master identification "M3" according to step S530.

According to steps S500 to S580 of FIG. 5, the second alias "NR2//10.0.0.1" of the aliases-in-memory list 25 was found in the configuration database and the matching alias "A_5" does not belong to the master identification "M3" of the second alias "NR2//10.0.0.1". Therefore, the master identification "M2" of the matching alias "A_5" is switched to the new master identification "M3" according to step S530.

FIGS. 17 to 20 is a second scenario of creating and handling identifications for resources in a configuration database, in accordance with an embodiment of the present invention.

Figure 17:
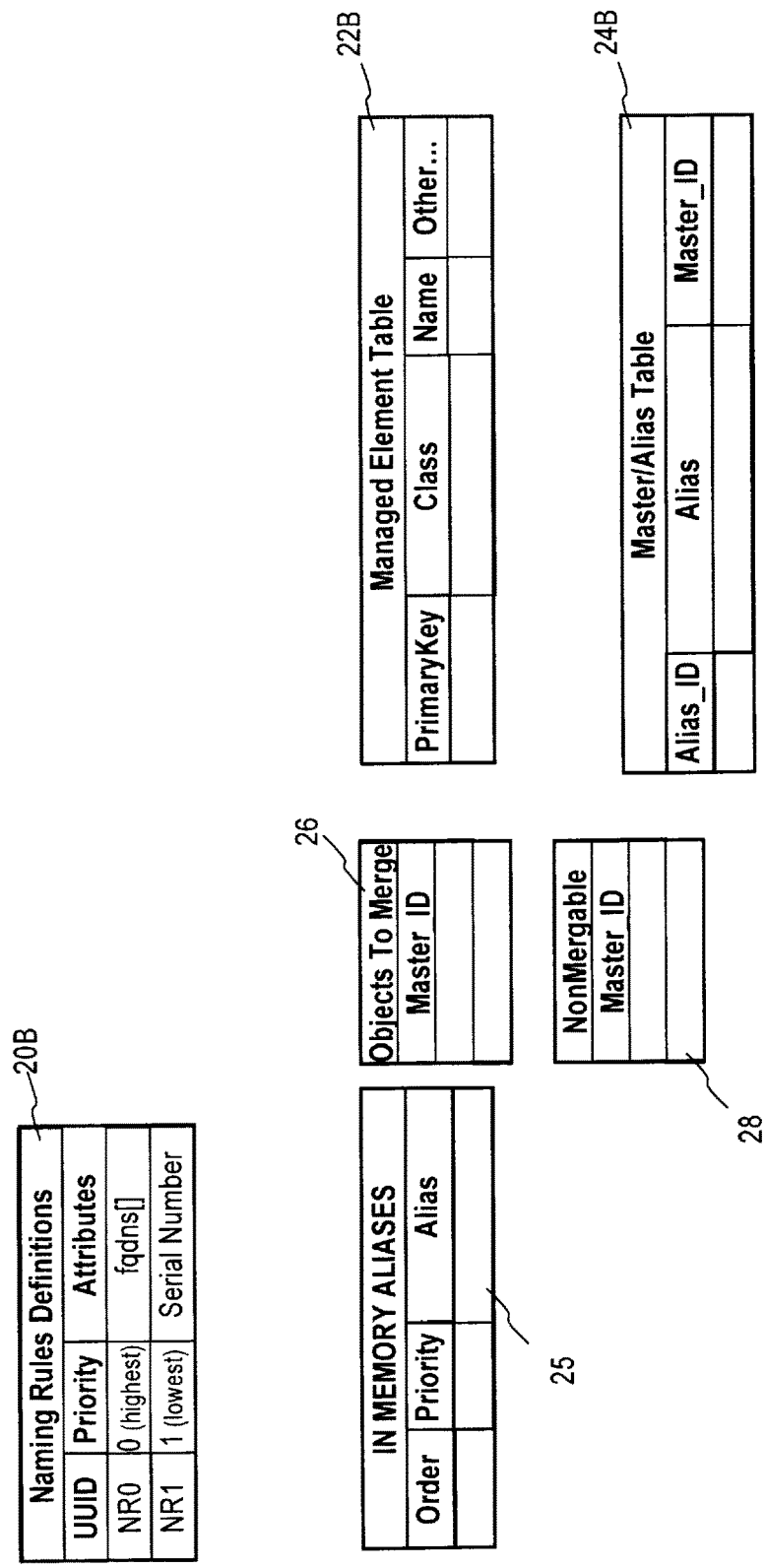
FIGS. 17 to 20 is another scenario of creating and handling identifications for resources in a configuration database, in accordance with an embodiment of the present invention.

Referring to FIG. 17, the second scenario uses the shown naming rule definition table 20B containing two entries. A first naming rule "NR0" has priority "0" and the attribute "fqdns[ ]", and a second naming rule "NR1" has priority "1" and the attribute "Serial Number". FIG. 17 shows initial states of corresponding managed element table 22B, master/alias table 24B, aliases-in-memory list 25, objects-to-merge list 26 and non-mergable objects list 28.

Figure 18:
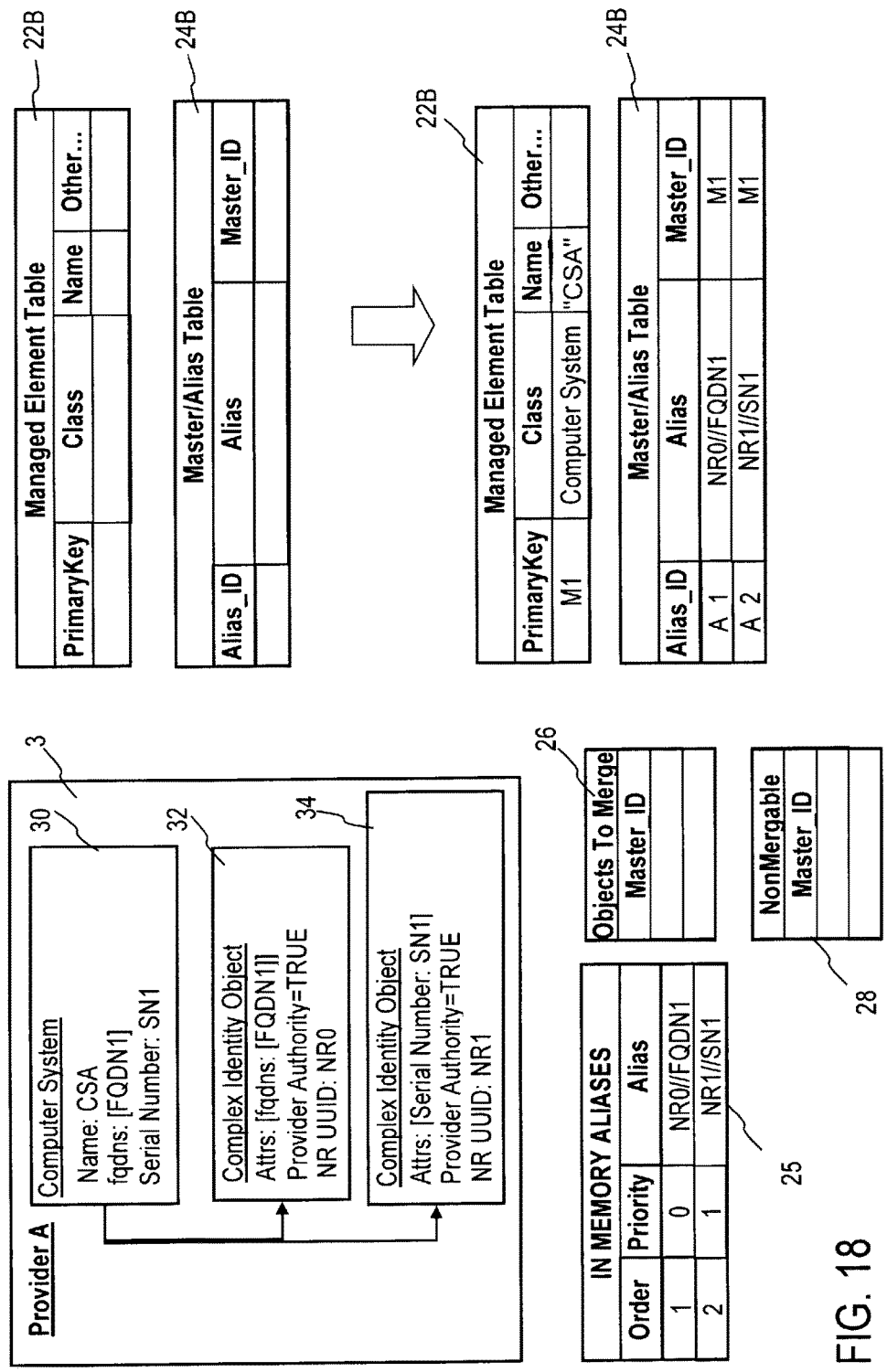

Referring to FIG. 18, according to steps S100 to S130 a managed element of a first data provider 3 is represented by a computer system 30 with name "CSA", fully qualified domain name "FQDN1", and serial number "SN1". According to step S140 of FIG. 1, for the computer system 30 both naming rules "NR0", "NR1" are applicable and two complex identity objects 32, 34 are created. A first complex identity object 32 contains naming rule identification "NR0", attribute name "fqdns" and attribute value "FQDN1", and a second complex identity object 34 contains naming rule identification "NR1", attribute name "Serial Number" and attribute value "SN1". According to step S150 of FIG. 1, for both complex identity objects 32, 34 the corresponding authority flag "Provider Authority" is set "TRUE".

According to steps S200 to S220 of FIG. 2, for the first complex identity object 32 a separate new alias name "NR0//FQDN1" is generated and stored in the aliases-in-memory list 25, and for the second complex identity object 34 a separate new alias name "NR1//SN1" is generated and stored in the aliases-in-memory list 25. So the aliases-in-memory list 25 contains a first entry with order number "1", priority "0", and alias name "NR0//FQDN1", and a second entry with order number "2", priority "1", and alias name "NR1//SN1". According to steps S220 to S270, for each alias from the aliases-in-memory list 25 the configuration database is searched for matching entries. Since the aliases "NR0//FQDN1", "NR1//SN1" in the aliases-in-memory list 25 are the first inserts, no matching entries are found. In the shown state, the objects-to-merge list 26 and the non-mergable objects list 28 are both empty. Therefore, a new master identification "M1" for the new resource 30 is generated according to step S330 of FIG. 3, and stored in the managed element table 22B of the configuration database according to step S340 of FIG. 3. So in the shown state the managed element table 22B contains one entry with primary key "M1", type or class "computer system", and name "CSA". According to steps S500 to S580 of FIG. 5, the first alias "NR0//FQDN1" is inserted with alias identification "A_1" and master identification "M1" as entry in the master/alias table 24B, and the second alias "NR1//SN1" is inserted with alias identification "A_2" and master identification "M1" as entry in the master/alias table 24B.

Figure 19:
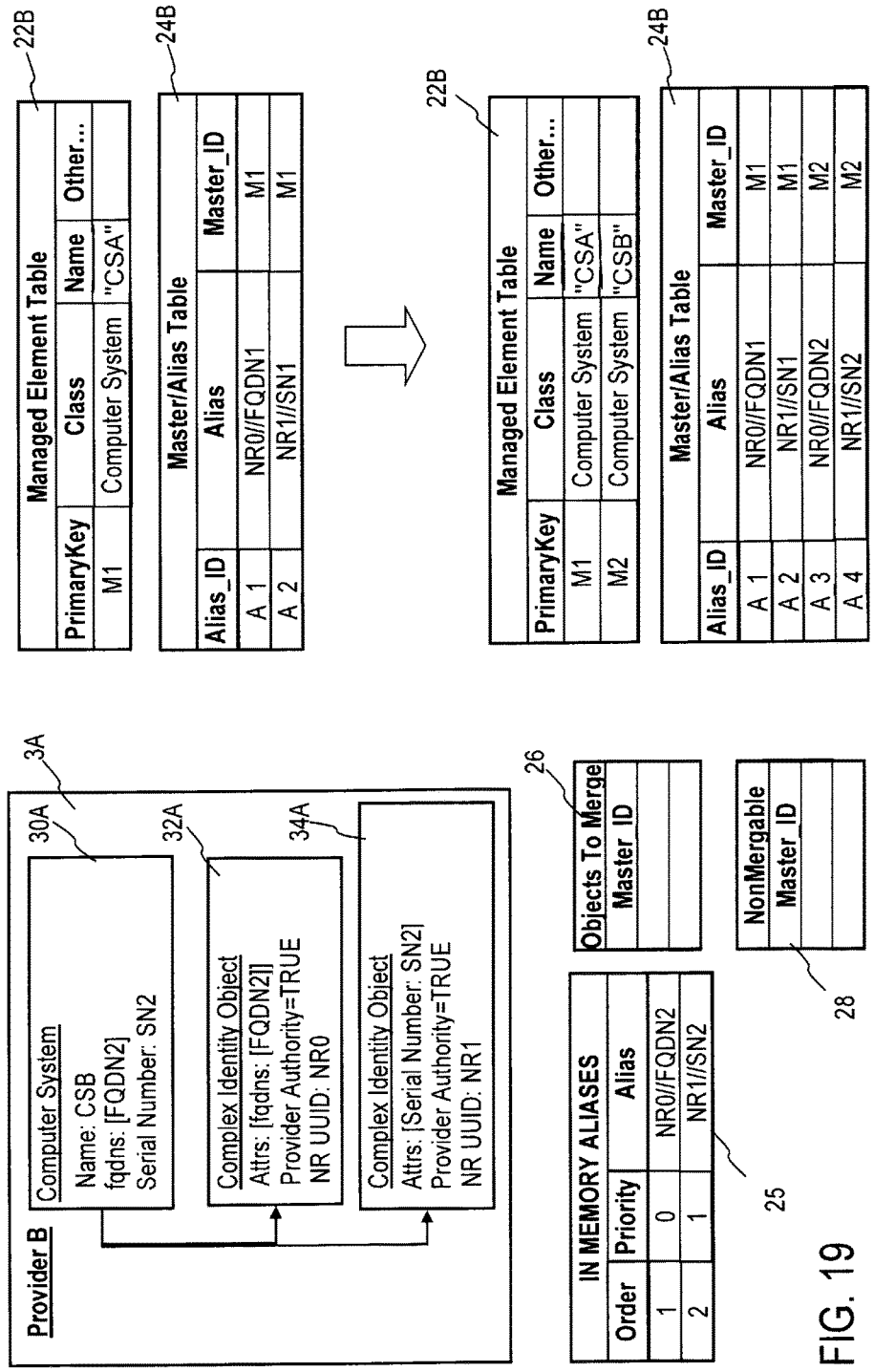

Referring to FIG. 19, according to steps S100 to S130 a managed element of a second data provider 3A is represented by a computer system 30A with name "CSB", fully qualified domain name "FQDN2", and serial number "SN2". According to step S140 of FIG. 1, for the computer system 30A both naming rules "NR0", "NR1" are applicable and two complex identity objects 32A, 34A are created. A first complex identity object 32A contains naming rule identification "NR0", attribute name "fqdns" and attribute value "FQDN2", and a second complex identity object 34A contains naming rule identification "NR1", attribute name "Serial Number" and attribute value "SN2". According to step S150 of FIG. 1, for both complex identity objects 32A, 34A the corresponding authority flag "Provider Authority" is set "TRUE". According to steps S200 to S220 of FIG. 2, for the first complex identity object 32A a separate new alias name "NR0//FQDN2" is generated and stored in the aliases-in-memory list 25, and for the second complex identity object 34A a separate new alias name "NR1//SN2" is generated and stored in the aliases-in-memory list 25. So the aliases-in-memory list 25 contains a first entry with order number "1", priority "0", and alias name "NR0//FQDN2", and a second entry with order number "2", priority "1", and alias name "NR1//SN2".

According to steps S220 to S270, for each alias from the aliases-in-memory list 25 the configuration database is searched for matching entries. Since no matching entries for the aliases "NR0//FQDN2", "NR1//SN2" are found in the configuration database, the objects-to-merge list 26 and the non-mergable objects list 28 are both empty, in the shown state. Therefore, a new master identification "M2" for the new resource 30A is generated according to step S330 of FIG. 3, and stored in the managed element table 22B of the configuration database according to step S340 of FIG. 3. So in the shown state the managed element table 22B contains a first entry with primary key "M1", type or class "computer system", and name "CSA", and a second entry with primary key "M2", type or class "computer system", and name "CSB". According to steps S500 to S580 of FIG. 5, the first alias "NR0//FQDN2" is inserted with alias identification "A_3" and master identification "M2" as an entry in the master/alias table 24B, and the second alias "NR1//SN2" is inserted with alias identification "A_4" and master identification "M2" as an entry in the master/alias table 24B.

Figure 20:
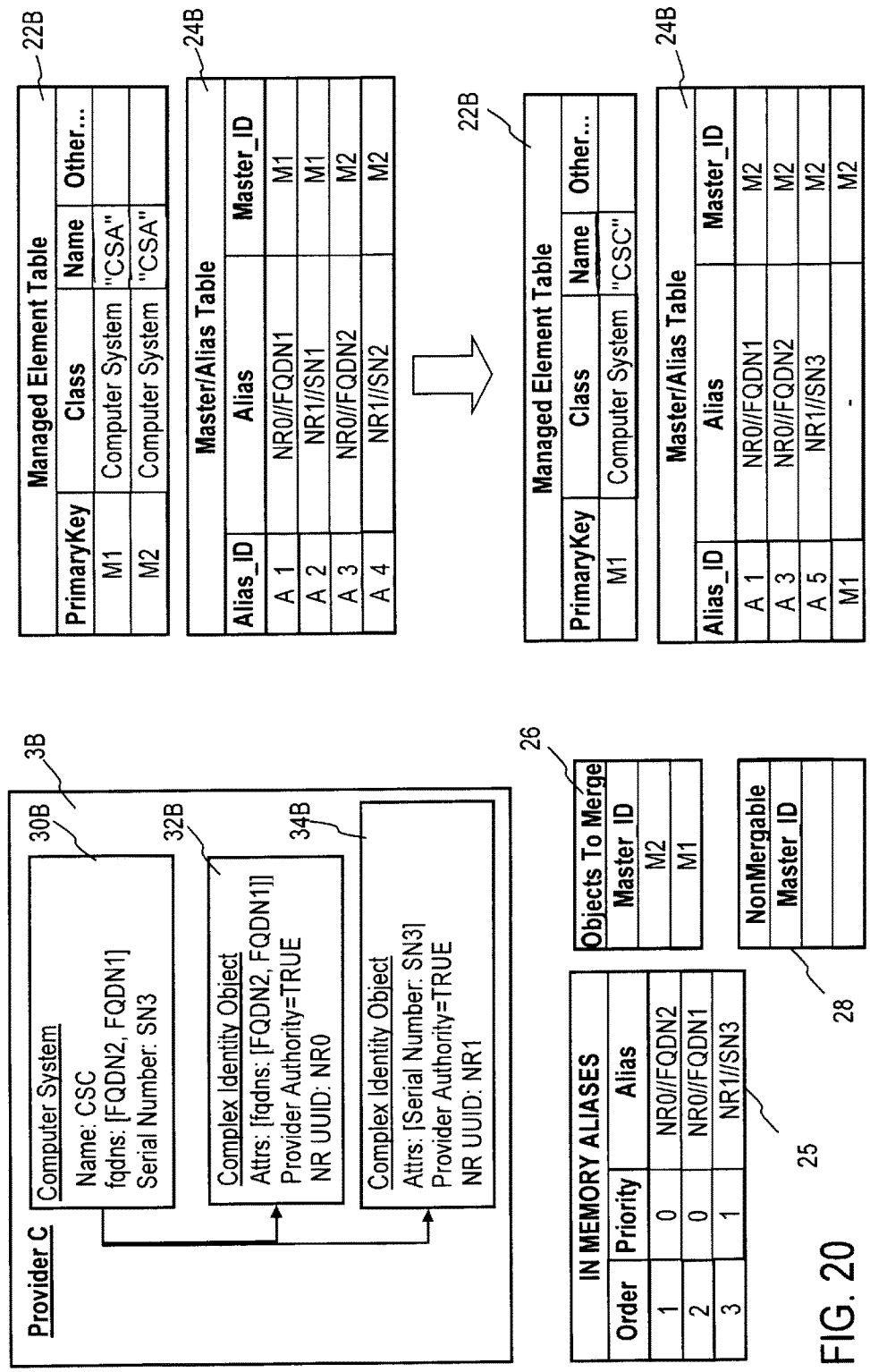

Referring to FIG. 20, according to steps S100 to S130 a managed element of a third data provider 3B is represented by a computer system 30B with name "CSC", fully qualified domain names "FQDN1", "FQDN2", and serial number "SN3". According to step S140 of FIG. 1, for the computer system 30B both naming rules "NR0", "NR1" are applicable and two complex identity objects 32B, 34B are created. A first complex identity object 32B contains naming rule identification "NR0", attribute name "fqdns" and attribute values "FQDN2", "FQDN1", and a second complex identity object 34B contains naming rule identification "NR1", attribute name "Serial Number" and attribute value "SN3". According to step S150 of FIG. 1, for both complex identity objects 32B, 34B the corresponding authority flag "Provider Authority" is set "TRUE".

According to steps S200 to S220 of FIG. 2, for the first complex identity object 32B two separate new alias names "NR0//FQDN2", "NR0//FQDN1" are generated and stored in the aliases-in-memory list 25, and for the second complex identity object 34B a separate new alias name "NR1//SN3" is generated and stored in the aliases-in-memory list 25. So the aliases-in-memory list 25 contains a first entry with order number "1", priority "0", and alias name "NR0//FQDN2", a second entry with order number "2", priority "0", and alias name "NR0//FQDN1" and a third entry with order number "3", priority "1", and alias name "NR1//SN3". According to steps S220 to S270, for the first alias "NR0//FQDN2" from the aliases-in-memory list 25 a matching entry with alias identification A_3 is found in the master/alias table 24B of the configuration database. Since the matching alias "NR0//FQDN2" in the configuration database is the highest priority alias of the aliases-in-memory list 25, the master identification "M2" of the matching entry is added to the objects-to-merge list 26, according to step S250 of FIG. 2.

According to steps S220 to S270, for the second alias "NR0//FQDN1" from the aliases-in-memory list 25 a matching entry with alias identification A_1 is found in the master/alias table 24B of the configuration database. Since the matching alias "NR0//FQDN1" in the configuration database is the highest priority alias of the aliases-in-memory list 25, the master identification "M1" of the matching entry is added to the objects-to-merge list 26, according to step S250 of FIG. 2. According to steps S220 to S270, for the third alias "NR1//SN3" from the aliases-in-memory list 25 no matching entries are found in the master/alias table 24B of the configuration database. Since the object to merge list 26 is not empty, the master identification "M2" is defined as a master identification of the first object from the objects-to-merge list 26, according to step S400 of FIG. 4. According to step S410 of FIG. 4, for the second object in the object to merge list 26 an alias entry is generated in the master/alias table 24B containing the first master identification "M1" as an alias identification and the second master identification "M2" as a master identification.

According to step S420 all resources or management element table entries with master identification "M1" are merged using a discovery date. Therefore, the first entry in the managed element table 22B with master identification "M1" as primary key, "computer system" as class or type, and "CSA" as name is changed to "CSC" as name and the second entry with master identification "M2" as primary key, "computer system" as class or type, and "CSB" as name is removed. According to steps S500 to S580 of FIG. 5, the first alias "NR0//FQDN2" from the aliases-in-memory list 25 is found in the master/alias table 24B of the configuration database. Since the first alias "NR0//FQDN2" from the aliases-in-memory list 25 is already an entry in the master/alias table 24B and belongs to the master identification "M2" of the matching entry "A_3" the matching entries "A_3" in the master/alias table 24B is not modified.

According to steps S500 to S580 of FIG. 5, the second alias "NR0//FQDN1" of the aliases-in-memory list 25 was found in the configuration database and the matching alias "A_1" does not belong to the master identification "M2" of the second alias "NR0//FQDN1". Therefore, the master identification "M1" of the matching alias "A_1" is switched to the new master identification "M2" according to step S530. According to steps S500 to S580 of FIG. 5, the third alias "NR1//SN3" was not found in the configuration database and is inserted with alias identification "A_5" and master identification "M2" as entry in the master/alias table 24B. Since the third provider 3B declares authority for the second complex identity object 13B, the aliases with the alias identities "A_2" and "A_4" are removed from the master/alias table 24B, because the attribute values "SN1" and "SN2" on which the aliases "NR1//SN1" and "NR1//SN2" are based, are no longer present in the second complex identity object 34B. Finally the master/alias table 24B contains four entries. A first entry with alias identification "A_1", alias name "NR0//FQDN1", and master identification "M2", a second entry with alias identification "A_3", alias name "NR0//FQDN", and master identification "M2", a third entry with alias identification "A_5", alias name "NR1//SN3", and master identification "M2", and fourth entry with alias identification "M1", no alias name, and master identification "M2".

As described herein, in an embodiment of the present invention, a method for creating and handling identification for a resource in a configuration database comprises: discovering the resource; creating for the resource a representation comprising properties of the resource; determining and analyzing defined naming rules for the configuration database, each naming rule comprising a naming rule identification, a priority and at least one attribute having an attribute name. For each naming rule applicable to the resource, extracting at least one attribute value for each attribute name from the resource representation as a combination and/or transformation of properties of the resource. For each naming rule applicable to the resource, creating a complex identity object containing a naming rule identification and a list of attribute names and attribute values of the corresponding naming rule. For each such created complex identity object, set an authority flag if a given provider is able to obtain a complete set of values for the attributes; processing through each complex identity object according to priority of the corresponding naming rule; and generating an alias for each result of a Cartesian product of each attribute value of the list of attributes names in the processed complex identity object by concatenating the corresponding naming rule identification and the attribute values. The complex identity object can also more simply be referred to as an identity object.

In further embodiments of the present invention, each generated alias is stored in an aliases-in-memory list together with the priority of a corresponding naming rule and an order number.

In further embodiments of the present invention, it is checked whether the resource is identical to an existing resource which is named with an identical existing alias in a master/alias table in the configuration database by comparing each alias in the aliases-in-memory list with existing aliases stored in the master/alias table.

In further embodiments of the present invention, a master identification is generated for the resource in case no matching alias is found in the master/alias table.

In further embodiments of the present invention, the resource is stored in the configuration database using the master identification as a primary key.

In further embodiments of the present invention, the alias is stored together with a corresponding alias identification and the master identification in the configuration database.

In further embodiments of the present invention, the resource is merged with the existing resource in case a matching alias is found in the master/alias table.

In further embodiments of the present invention, the matching alias is added in the configuration database to an objects-to-merge list, if the matching alias has the highest priority of the aliases-in-memory list, else the matching alias is added to a non-mergable-objects list.

In further embodiments of the present invention, the matching alias of the aliases-in-memory list with the highest priority is added to the top of the objects-to-merge list, if the aliases-in-memory list contains only non-mergable objects.

In further embodiments of the present invention, the master identification of a first object of the objects-to-merge list is defined as a master identification of the resource, and for any other object in the objects-to-merge list, alias entries are generated in the master/alias table of the configuration database using a master identification of a corresponding object-to-merge-list entry as an alias identification and the master identification of a previously stored resource as a master identification.

In further embodiments of the present invention, resources or management elements contained as entries in the managed element table are merged with the master identification using a discovery date.

In further embodiments of the present invention, master identification of a first object of the objects-to-merge list is defined as a master identification of the resource.

In further embodiments of the present invention, the master identification of matching existing aliases in the configuration database are switched to a master identification of the aliases in the aliases-in-memory list; wherein all other aliases for the master identification generated from a corresponding naming rule are removed, if the authority flag is set for the corresponding complex identity object.

In another embodiment of the present invention, a data processing program for execution in a data processing system comprises software code portions for performing a method for creating and handling identification for a resource in a configuration database when the program is run on the data processing system.

In yet another embodiment of the present invention, a computer program product stored on a computer-usable medium, comprises computer-readable program means for causing a computer to perform a method for creating and handling identification for a resource in a configuration database when the program is run on the computer.

One idea of the present invention is based on using complex identity objects associated with the common data model instances and naming rule definition, to provide information used to create object identity in the similar way as it would be created by directly reading an object's attributes.

All in all, embodiments of the present invention do not define naming rules as a set of attributes from the object for which identity aliases are to be generated but allow the data provider to store a complex identity object along with a composite key object loosely based on attributes of the object itself, i.e. using the same values of the attributes or using other values which are not necessarily stored directly as attributes or possibly using parts of the attributes.

Embodiments of the present invention create an identity tag for an asset by combining one or more complex identities consisting of a number of key-value pairs and/or a specific naming rule based on the mentioned key-value pairs. The data provider can use one or more selected naming rules defined in a common data model and/or a common information model (CDM/CIM) as key-value pairs.

Compared to the prior art, embodiments of the present invention do not require a model to be updated and have lower costs of keeping the model current with technology. As no new attributes have to be added to the model to be able to use a new naming rule definition for calculating an object identification, a new naming rule uses only data provider updates without changes to the model database schema. In addition, values used for a naming rule might not be 'user friendly' or not necessarily used to reflect real object properties. For example, one of the Tivoli Common Data Model naming rules for a computer system is a signature built from one IP (Internet Protocol) address and one MAC (Media Access Control) address. This property does not provide any value to the user, other than just reconciliation. This allows a model to be more consistent and contain only information relevant from a configuration management perspective. It is also possible to use parts of the attributes in a naming rule without adding them explicitly to the model.

Naming rules defined according to prior art could contain some naming parts (attributes) that should be empty for a given naming rule to be applicable to a given model object. Those omitted naming parts lead to naming rule duplication. For example, consider the following naming rules for a computer system model object:

NR1="–VMID,manufacturer,model,serialNumber"
NR6="VMID,manufacturer,model,serialNumber"

By using only naming rule "NR6" it is not possible to name computer systems in non-virtual environments for which an attribute "VMID" is always empty. Removing the VMID attribute from the naming rule "NR6" would result in many virtual computer systems with the same values for manufacturer, model and serial number merging in just one model object instance. Embodiments of the present invention duplicate the naming rule and denote that naming rule "NR1" should be used only if the value of the attribute "VMID" is empty. If it is not empty then only naming rule "NR6" is applicable and the values of the attribute "VMID" distinguish computer systems with the same values for manufacturer, model and serial number.

In embodiments of the present invention, it is at the data provider's discretion to decide which naming rule is applicable and should be used; thus, eliminating the necessity for omitted naming parts and limiting the number of naming rules.

In cases when a given naming rule based on an array attribute may be provided by multiple data providers, the data provider may claim itself as having authority to a given key/naming rule. In the case of a provider with authority, all already existing complex identifications defined by using the same naming rule associated with the object are completely replaced, respectively removed, merged or added by the newest data. Complex identities reported by a data provider without authority are respectively merged or added to the list of current identifications.

This allows the handling of cases where a naming rule is created from the set of attributes and any single one is assumed to be guaranteeing uniqueness. A typical example is a computer system object identified by its IP address. Every IP address is assumed to be uniquely identifying this computer system at the given point of time. In that example, an authority parameter does not allow providers which are not able to recognize all the IP addresses of the computer system, e.g. due to used technology constraints, to remove other IP addresses as this particular provider does not have knowledge whether other IP addresses at the moment are assigned to the computer system or not. At the same time, a provider being able to recognize all IP addresses is able to claim authority and in that case is able to remove computer system unique identifications (aliases) based on IP addresses no longer being assigned to that machine or computer system.

By introducing at least one provider with authority for a given naming rule, it is possible to use temporary unique naming rules, e.g., an IP address in an environment where IP addresses might be changing dynamically, and to reduce a problem of over-merges, i.e. merging of a computer system with another, after an IP address has been moved from the first machine to the other. Further, the use of a provider with authority removes IP addresses from the machine where they are no longer configured allowing reuse of IP addresses as naming rules for the other machine, without a false merge.

A naming rule might have "cardinality" defined allowing use of two contradictory cases. In a first case, a naming rule containing a set of properties and values is defined as "applicable" more than one time for a single object, referred as naming rule cardinality, allowing reconciliation to be based not on exact match but rather on overlapping of value ranges. For example, identification of a computer system might be done by any IP address out of a list of IP addresses associated to the computer system. Data provider might in that case use one naming rule [NR: IP Address, cardinality:

"multiple"] causing a generation of separate alias identifiers for each IP address. At the same time, it is also possible in a second case to use naming rules which are requiring all elements to be set to define object identity. For example, a routing path object requires all path nodes (IP addresses) objects to be the same to identify a single routing path object. In that case, a provider might use naming rule: [NR: IP address, cardinality: "single"], which in effect will generate one identity alias consisting of all IP addresses.

In prior art solutions it is not possible to use array based attributes as parts of naming rules. This renders both cases mentioned above impossible to implement in this solution. To satisfy the first case with using attribute based naming rules, a naming rule should be defined as [NR: IP addresses] and an object has an IP addresses property defined as an array type. A reconciliation engine generates separate aliases for each array element. The scenario for the second case calculates one alias from all elements of the array type attribute. A routing path object has an array of computer system relations attribute nodes and a naming rule is defined as [NR: nodes]), which is completely contradictory to the reconciliation engine behavior required by the first case.

Calculation of an alias identity, i.e. naming rule and values, is not based on attribute names as described in prior art but on an attribute's absolute position in a naming rule definition and unique identification of the naming rule definition. Alias identity consists of concatenated values of naming rule GUID and attributes' values with separators between attributes values. Each attribute has assigned a fixed position in a given naming rule.

Embodiments of the present invention provide global uniqueness of the alias which wouldn't be possible with using just attributes' values, i.e. two different objects might have distinct attributes with the same values, e.g. object 1 (cluster) with clusterid="a", and object2 (cluster) with clusterName="a", but this approach generally results in sparser aliases due to skipping attributes' names. Further, embodiments of the present invention provide ease of use for the provider, since the provider does not have to care about the ordering of attributes. The provider just sends attribute name and value pairs. This would not be the case if the provider had to use the same attributes order as in a naming rule definition. Further, embodiments of the present invention allow skipping of attributes names from naming strings removing their dependency on a naming rule definition. This gives embodiments of the present invention the ability to adjust and/or change naming rule attributes names. This could be used, for example, for widening the scope of a naming rule for new types of instances, for naming rules which are already in use in the system, i.e. there are objects with aliases generated, without regenerating already generated aliases.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of creating and handling identification for a resource in a configuration database, comprising:

discovering said resource;

creating, by a processing circuit, for said resource, a resource representation comprising properties of said resource;

determining one or more defined naming rules for said configuration database, the one or more defined naming rules each corresponding to the resource and comprising a respective naming rule identification, a respective priority, and a respective at least one attribute, each attribute of the at least one attribute having a respective attribute name;

for each naming rule of the one or more naming rules, extracting from the resource representation at least one attribute value for each attribute name of the at least one attribute of the naming rule;

for each naming rule of the one or more naming rules, creating a corresponding complex identity object containing the naming rule identification of the naming rule and a list of attribute names and corresponding attribute values, for each attribute name of the list, extracted from the resource representation, wherein the creating produces one or more created complex identity objects;

for each created complex identity object of the one or more created complex identity objects, setting an authority flag of the complex identity object based on whether a given provider of attribute value data is able to obtain a complete set of attribute values; and processing through the one or more complex identity objects according to priority of said one or more naming rules corresponding to the one or more created complex identity objects, wherein, in processing each complex identity object of the one or more complex identity objects, a respective one or more aliases for the resource are generated based on a Cartesian product of the naming rule identification of the complex identity object and the attribute values corresponding to the attribute names in said list of attribute names of the processed complex identity object, and wherein the respective one or more aliases generated based on processing each complex identity object produces a set of aliases as candidates to associate with a master identification for the resource.

2. The method according to claim 1, wherein an alias, of the set of aliases, generated from processing a complex identity object of the one or more complex identity objects is stored in an aliases-in-memory list together with an order number and the priority of the naming rule to which the complex identity object corresponds.

3. The method according to claim 2, further comprising checking whether said resource is identical to an existing resource which is named with an identical existing alias in a master/alias table in said configuration database by comparing at least one alias in said aliases-in-memory list with existing aliases stored in said master/alias table.

4. The method according to claim 3, further comprising generating the master identification for said resource in case no matching alias is found in said master/alias table.

5. The method according to claim 4, further comprising indicating said resource in said configuration database using said master identification as a primary key.

6. The method according to claim 4, further comprising storing said alias together with a corresponding alias identification and said master identification in said configuration database.

7. The method according to claim 3, further comprising indicating said resource and said existing resource as being the same resource, in case a matching alias is found in said master/alias table.

8. The method according to claim 7, further comprising adding the matching alias in said configuration database to an objects-to-merge list, based on said matching alias having a highest priority of said aliases-in-memory list.

9. The method according to claim 8, further comprising adding the matching alias of said aliases-in-memory list with a highest priority to a top of the objects-to-merge list, based on said aliases-in-memory list containing only non-mergeable objects.

10. The method according to claim 8, further comprising defining a master identification of a first object of the objects-to-merge list as the master identification of said resource, and, for other objects in the objects-to-merge list, generating alias entries in the master/alias table of said configuration database using the master identification of a corresponding object-to-merge-list entry as an alias identification and said master identification of a previously indicated resource as the master identification.

11. The method according to claim 10, further comprising merging at least one of resources or management elements contained as entries in the managed element table with said master identification using a discovery date.

12. The method according to claim 8, further comprising defining a master identification of a first object of the objects-to-merge list as the master identification of said resource.

13. The method according to claim 12, further comprising switching the master identification of matching existing aliases in said configuration database to the master identification of said aliases in said aliases-in-memory list, wherein other aliases for said master identification are removed, based on said authority flag being set for the complex identity objects processed to generate those other aliases.

14. A computer program product for creating and handling identification for a resource in a configuration database, comprising:
a non-transitory computer readable storage medium readable by a processing circuit and storing instructions for execution by the processing circuit for performing a method comprising:
discovering said resource;
creating for said resource a resource representation comprising properties of said resource;
determining one or more defined naming rules for said configuration database, the one or more defined naming rules each corresponding to the resource and comprising a respective naming rule identification, a respective priority, and a respective at least one attribute, each attribute of the at least one attribute having a respective attribute name;
for each naming rule of the one or more naming rules, extracting from the resource representation at least one attribute value for each attribute name of the at least one attribute of the naming rule;
for each naming rule of the one or more naming rules, creating a corresponding complex identity object containing the naming rule identification of the naming rule and a list of attribute names and corresponding attribute values, for each attribute name of the list, extracted from the resource representation, wherein the creating produces one or more created complex identity objects;
for each created complex identity object of the one or more created complex identity objects, setting an authority flag of the complex identity object based on whether a given provider of attribute value data is able to obtain a complete set of attribute values; and
processing through the one or more complex identity objects according to priority of said one or more naming rules corresponding to the one or more created complex identity objects, wherein, in processing each complex identity object of the one or more complex identity objects, a respective one or more aliases for the resource are generated based on a Cartesian product of the naming rule identification of the complex identity object and the attribute values corresponding to the attribute names in said list of attribute names of the processed complex identity object, and wherein the respective one or more aliases generated based on processing each complex identity object produces a set of aliases as candidates to associate with a master identification for the resource.

15. The computer program product according to claim 14, wherein an alias, of the set of aliases, generated from processing a complex identity object of the one or more complex identity objects is stored in an aliases-in-memory list together with an order number and the priority of the naming rule to which the complex identity object corresponds.

16. The computer program product according to claim 15, wherein the method further comprises checking whether said resource is identical to an existing resource which is named with an identical existing alias in a master/alias table in said configuration database by comparing at least one alias in said aliases-in-memory list with existing aliases stored in said master/alias table.

17. The computer program product according to claim 16, wherein the method further comprises indicating said resource and said existing resource as being the same resource, in case a matching alias is found in said master/alias table.

18. A computer system for creating and handling identification for a resource in a configuration database, comprising:
a memory storing program instructions; and
a processing device in communication with the memory, the processing device configured to execute the program instructions to perform a method, said method comprising:

discovering said resource;

creating for said resource a resource representation comprising properties of said resource;

determining one or more defined naming rules for said configuration database, the one or more defined naming rules each corresponding to the resource and comprising a respective naming rule identification, a respective priority, and a respective at least one attribute, each attribute of the at least one attribute having a respective attribute name;

for each naming rule of the one or more naming rules, extracting from the resource representation at least one attribute value for each attribute name of the at least one attribute of the naming rule;

for each naming rule of the one or more naming rules, creating a corresponding complex identity object containing the naming rule identification of the naming rule and a list of attribute names and corresponding attribute values, for each attribute name of the list, extracted from the resource representation, wherein the creating produces one or more created complex identity objects;

for each created complex identity object of the one or more created complex identity objects, setting an authority flag of the complex identity object based on whether a given provider of attribute value data is able to obtain a complete set of attribute values; and processing through the one or more complex identity objects according to priority of said one or more naming rules corresponding to the one or more created complex identity objects, wherein, in processing each complex identity object of the one or more complex identity objects, a respective one or more aliases for the resource are generated based on a Cartesian product of the naming rule identification of the complex identity object and the attribute values corresponding to the attribute names in said list of attribute names of the processed complex identity object, and wherein the respective one or more aliases generated based on processing each complex identity object produces a set of aliases as candidates to associate with a master identification for the resource.

19. The computer program product according to claim 18, wherein an alias, of the set of aliases, generated from processing a complex identity object of the one or more complex identity objects, is stored in an aliases-in-memory list together with an order number and the priority of the naming rule to which the complex identity object corresponds.

20. The computer program product according to claim 19, wherein the method further comprises checking whether said resource is identical to an existing resource which is named with an identical existing alias in a master/alias table in said configuration database by comparing at least one alias in said aliases-in-memory list with existing aliases stored in said master/alias table.

* * * * *